United States Patent
Cricrì et al.

(10) Patent No.: US 12,549,742 B2
(45) Date of Patent: Feb. 10, 2026

(54) REGION-BASED FILTERING

(71) Applicant: Nokia Technologies Oy, Espoo (FI)

(72) Inventors: Francesco Cricrì, Tampere (FI); Miska Matias Hannuksela, Tampere (FI); Honglei Zhang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 47 days.

(21) Appl. No.: 18/607,017

(22) Filed: Mar. 15, 2024

(65) Prior Publication Data

US 2024/0340431 A1 Oct. 10, 2024

Related U.S. Application Data

(60) Provisional application No. 63/494,783, filed on Apr. 7, 2023.

(51) Int. Cl.
*H04N 19/00* (2014.01)
*H04N 19/169* (2014.01)

(52) U.S. Cl.
CPC .................. *H04N 19/169* (2014.11)

(58) Field of Classification Search
CPC ............. H04N 19/169; H04N 19/117
See application file for complete search history.

(56) References Cited

U.S. PATENT DOCUMENTS

| | | | | |
|---|---|---|---|---|
| 2011/0274158 A1* | 11/2011 | Fu | ........... | H04N 19/134 375/E7.127 |
| 2013/0321628 A1* | 12/2013 | Eng | ........... | B60R 1/31 348/148 |
| 2015/0002545 A1* | 1/2015 | Webster | ........... | G09G 5/377 345/634 |
| 2015/0117725 A1* | 4/2015 | He | ........... | G06V 40/168 382/118 |
| 2016/0125235 A1* | 5/2016 | Gu | ........... | G06T 7/215 382/103 |
| 2016/0358337 A1* | 12/2016 | Dai | ........... | G06T 7/11 |
| 2017/0132758 A1* | 5/2017 | Paluri | ........... | G06V 20/44 |
| 2017/0200279 A1* | 7/2017 | Zhong | ........... | G06T 7/194 |
| 2017/0337693 A1* | 11/2017 | Baruch | ........... | G06T 7/12 |

(Continued)

FOREIGN PATENT DOCUMENTS

| | | |
|---|---|---|
| WO | 2022/167977 A1 | 8/2022 |
| WO | 2022/180031 A1 | 9/2022 |
| WO | 2023/280558 A1 | 1/2023 |

OTHER PUBLICATIONS

Prabhushankar et al., "Semantically Interpretable and Controllable Filter Sets," 2018 25th IEEE International Conference on Image Processing (ICIP), Athens, Greece, 2018, pp. 1053-1057, doi: 10.1109/ICIP.2018.8451220.*

(Continued)

*Primary Examiner* — Frank F Huang
(74) *Attorney, Agent, or Firm* — Nokia Technologies Oy

(57) ABSTRACT

Various embodiments describe apparatus, method and computer program product. An example apparatus includes at least one processor; and at least one non-transitory memory storing instructions that, when executed by the at least one processor, cause the apparatus at least to perform: receiving a frame to be filtered; receiving semantic information about the frame to be filtered; and filtering the frame based at least on the semantic information.

18 Claims, 7 Drawing Sheets

(56) References Cited

U.S. PATENT DOCUMENTS

| | | | |
|---|---|---|---|
| 2018/0246187 A1* | 8/2018 | Baba | G01S 13/60 |
| 2018/0322366 A1* | 11/2018 | Lim | G06F 18/2155 |
| 2019/0095722 A1* | 3/2019 | Kang | G06V 20/588 |
| 2019/0188855 A1* | 6/2019 | Mendes Rodrigues | G06T 7/11 |
| 2019/0272658 A1* | 9/2019 | Takahashi | H04N 1/32128 |
| 2020/0137399 A1* | 4/2020 | Li | H04N 19/593 |
| 2020/0218961 A1* | 7/2020 | Kanazawa | G06N 3/045 |
| 2020/0304836 A1 | 9/2020 | Li et al. | |
| 2022/0201282 A1* | 6/2022 | Chang | H04N 19/105 |
| 2022/0321919 A1 | 10/2022 | Deshpande | |
| 2022/0385888 A1* | 12/2022 | Lee | H04N 19/61 |
| 2022/0385896 A1 | 12/2022 | Ding et al. | |
| 2023/0007272 A1* | 1/2023 | Tourapis | H04N 19/52 |
| 2023/0015638 A1* | 1/2023 | Lee | H04N 19/119 |
| 2023/0109719 A1* | 4/2023 | Kidani | H04N 19/105 375/240.02 |
| 2023/0112309 A1 | 4/2023 | Hannuksela et al. | |
| 2023/0231992 A1* | 7/2023 | Chen | H04N 19/105 375/240.02 |
| 2023/0388494 A1* | 11/2023 | Hong | H04N 19/11 |

OTHER PUBLICATIONS

Sullivan et al. Joint Video Experts Team (JVET) of ITU-T SG 16 WP 3 and ISO/IEC JTC 1/SC 29 23rd Meeting, https://view.officeapps.live.com/op/view.aspx?src=https%3A%2F%2Fwww.itu.int%2wftp3%2Faf-arch%2Fjvet-site%2F2021_07_W_Virtual%2FJVET-W_Notes_dA.docx&wdOrigin=BROWSELINK 23rd Meeting. Jul. 2021.*

"Video coding for low bit rate communication", Series H: Audiovisual and Multimedia Systems, Infrastructure of audiovisual services—Coding of moving video, Recommendation ITU-T H.263, Jan. 2005, 226 pages.

"Advanced video coding for generic audiovisual services", Series H: Audiovisual and Multimedia Systems, Infrastructure of audiovisual services—Coding of moving video, Recommendation ITU-T H.264, Aug. 2021, 844 pages.

"High efficiency video coding", Series H: Audiovisual and Multimedia Systems, Infrastructure of audiovisual services—Coding of moving video, Recommendation ITU-T H.265, Aug. 2021, 716 pages.

"Versatile video coding", Series H: Audiovisual and Multimedia Systems, Infrastructure of audiovisual services—Coding of moving video, Recommendation ITU-T H.266, Apr. 2022, 536 pages.

"Versatile supplemental enhancement information messages for coded video bitstreams", Series H: Audiovisual and Multimedia Systems, Infrastructure of audiovisual services—Coding of moving video, Recommendation ITU-T H.274, May 2022, 110 pages.

Mccarthy et al., "Additional SEI messages for VSEI (Draft 3)", Joint Video Experts Team (JVET) of ITU-T SG 16 WP 3 and ISO/IEC JTC 1/SC 29, JVET-AB2006-v1, 28th Meeting, Oct. 20-28, 2022, pp. 1-22.

"Information technology—Multimedia content description interface—Part 17: Compression of neural networks for multimedia content description and analysis", ISO 15938-17, 83 pages.

Cheng et al., "A Novel Post-Processing Method Based on a Weighted Composite Filter for Enhancing Semantic Segmentation Results", Sensors, vol. 20, No. 19, Sep. 25, 2020, pp. 1-13.

"Information technology—Generic coding of moving pictures and associated audio information: Systems", Series H: Audiovisual and Multimedia Systems, Infrastructure of audiovisual services—Transmission multiplexing and synchronization, Recommendation ITU-T H.222.0, Jun. 2021, 340 pages.

"Information technology—Generic coding of moving pictures and associated audio information: Video", Series H: Audiovisual and Multimedia Systems, Infrastructure of audiovisual services—Coding of moving video, Recommendation ITU-T H.262, Feb. 2000, 220 pages.

"Information technology—Universal coded character set (UCS)", ISO/IEC 10646, Sixth edition, Dec. 2020, 15 pages.

"Parameter values for ultra-high definition television systems for production and international programme exchange", Recommendation ITU-R BT.2020-2, Oct. 2015, 8 pages.

"Parameter values for the HDTV standards for production and international programme exchange", Recommendation ITU-R BT.709-6, Jun. 2015, 19 pages.

Hannuksela, "AHG8: Single-layer scalability approach", Joint Video Experts Team (JVET) of ITU-T SG 16 WP 3 and ISO/IEC JTC 1/SC 29/WG 11, JVET-O1150, 15th Meeting, Jul. 3-12, 2019, pp. 1-5.

* cited by examiner

REGION-BASED FILTERING

TECHNICAL FIELD

The examples and non-limiting embodiments relate generally to multimedia transport and neural networks, and more particularly, to method, apparatus, and computer program product for region-based filtering.

BACKGROUND

It is known to provide video encoding and decoding.

SUMMARY

An example apparatus includes at least one processor; and at least one non-transitory memory storing instructions that, when executed by the at least one processor, cause the apparatus at least to: receive a frame to be filtered; and use a semantic information for adapting filtering operations of a filter, wherein pixels associated with different semantic information are filtered in a different manner.

The example apparatus may further include, wherein the different manner comprises different filtering strengths or different processing operations.

The example apparatus may further include, wherein the semantic information comprises: data describing one or more semantic features of the frame; or a mask.

The example apparatus may further include, wherein the one or more semantic features comprises one or more of the following: position and size information of one or more regions present in the input image that are to be treated specifically by the postfilter; position and size information of one or more objects comprised in the frame; contour, silhouette, or shape of the one or more objects comprised in the frame; information about a class or category to which an object belongs; textual object label; a language of the object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The example apparatus may further include, wherein the apparatus is further caused to determine or generate the semantic information.

The example apparatus may further include, wherein the apparatus is further caused to signal the semantic information to a decoder side as metadata.

The example apparatus may further include, wherein the apparatus is further caused to run one or more machine analysis tasks on an uncompressed frame associated with the frame or a different frame.

The example apparatus may further include, wherein the apparatus is further caused to run one or more machine analysis tasks on the frame that is to be filtered, on a filtered frame, or on another frame.

The example apparatus may further include, wherein the apparatus is further caused to run one or more machine analysis tasks on a filtered frame and the semantic information is fed back to the filter for filtering either the filtered frame or for filtering another frame.

The example apparatus may further include, wherein the one or more machine analysis tasks are run at an encoder side or the decoder side, and wherein a first machine analysis task of the one or more machine analysis tasks run at the encoder side differ in one or more features from a second machine analysis task of the one or more machine analysis tasks.

The example apparatus may further include, wherein the one or more features comprises one or more of following: a type of task; an architecture of a neural network performing a task; or value of one or more parameters comprised in the neural network performing the one or more machine analysis tasks.

The example apparatus may further include, wherein the apparatus is further caused to receive the semantic information is received from an external source, and wherein when the semantic information is received from the external source, the semantic information is provided directly to the filter or it may be provided to an interface that converts an input signal into a format of semantic information that is accepted by the filter.

The example apparatus may further include, wherein the apparatus is further caused to receive semantic information from a user based on a decoded frame.

The example apparatus may further include, wherein the frame comprises a first subset of frames and a second subset of frames, and wherein the apparatus is further caused to perform: generating the semantic information for the first subset of frames; and using the semantic information as an input to the filter when filtering the second subset of frames.

The example apparatus may further include, wherein the use of the semantic information within the filter is determined by the weights of the filter that were trained during a training process; or the use of the semantic information within the filter is determined by a set of rules defined by a designer of the filtering process.

The example apparatus may further include, wherein: the filter processes one or more pixels belonging to one or more regions comprised or indicated in at least part of the semantic information differently as compared to pixels not belonging to the one or more regions to enhance the accuracy of one or more task neural networks applied to an output of the filter or to data derived from an output of the filter; or the filter processes one or more pixels belonging to one or more regions comprised or indicated in at least part of the semantic information differently than pixels not belonging to the one or more regions to enhance a user viewing experience.

The example apparatus may further include, wherein the apparatus is further caused to: use the one or more regions comprised or indicated in the semantic information to determine respective one or more subsets of pixels comprised in the set of pixels of the frame, wherein the one or more subsets of pixels correspond spatially to the one or more regions; and provide the one or more subsets of pixels as input to the filter.

The example apparatus may further include, wherein the apparatus is further caused to: use the one or more regions comprised in the semantic information to determine a subset of pixels comprised in the set of pixels of the frame, wherein the subset of pixels comprises pixels that correspond spatially to the one or more regions and comprise a rectangular shape; and provide the set of pixels as input to the filter.

The example apparatus may further include, wherein the one or more regions comprised or indicated in the semantic information are used to determine which part of the frame to be filtered is to be replaced with one or more outputs of the filter.

The example apparatus may further include, wherein the apparatus is further caused to apply a post-processing operation to an output of the filter or to data derived from an output of the filter, wherein the post-processing operation is performed based on one or more parameters, and wherein the one or more parameters are predefined, or are signaled from an encoder to a decoder or a receiver.

The example apparatus may further include, wherein the apparatus is further caused to use a supplemental enhancement information (SEI) message or a regional neural-network post-filter activation SEI message to carry or signal the semantic information for filtering the frames for which a post-filter is activated by the SEI message.

An example method includes: receiving a frame to be filtered; and use a semantic information for adapting filtering operations of a filter, wherein pixels associated with different semantic information are filtered in a different manner.

The example method may further include, wherein the different manner comprises different filtering strengths or different processing operations.

The example method may further include, wherein the semantic information comprises: data describing one or more semantic features of the frame; or a mask.

The example method may further include, wherein the one or more semantic features comprises one or more of the following: position and size information of one or more regions present in the input image that are to be treated specifically by the postfilter; position and size information of one or more objects comprised in the frame; contour, silhouette, or shape of the one or more objects comprised in the frame; information about a class or category to which an object belongs; textual object label; a language of the object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The example method may further include determining or generating the semantic information.

The example method may further include signaling the semantic information to a decoder side as metadata.

The example method may further include running one or more machine analysis tasks on an uncompressed frame associated with the frame or a different frame.

The example method may further include running one or more machine analysis tasks on the frame that is to be filtered, on a filtered frame, or on another frame.

The example method may further include running one or more machine analysis tasks on a filtered frame and the semantic information is fed back to the filter for filtering either the filtered frame or for filtering another frame.

The example method may further include, wherein the one or more machine analysis tasks are run at an encoder side or the decoder side, and wherein a first machine analysis task of the one or more machine analysis tasks run at the encoder side differ in one or more features from a second machine analysis task of the one or more machine analysis tasks.

The example method may further include, wherein the one or more features comprises one or more of following: a type of task; an architecture of a neural network performing a task; or value of one or more parameters comprised in the neural network performing the one or more machine analysis tasks.

The example method may further include receiving the semantic information is received from an external source, and wherein when the semantic information is received from the external source, the semantic information is provided directly to the filter or it may be provided to an interface that converts an input signal into a format of semantic information that is accepted by the filter.

The example method may further include receiving semantic information from a user based on a decoded frame.

The example method may further include, wherein the frame comprises a first subset of frames and a second subset of frames, and wherein the method further comprises: generating the semantic information for the first subset of frames; and using the semantic information as an input to the filter when filtering the second subset of frames.

The example method may further include, wherein the use of the semantic information within the filter is determined by the weights of the filter that were trained during a training process; or the use of the semantic information within the filter is determined by a set of rules defined by a designer of the filtering process.

The example method may further include, wherein: the filter processes one or more pixels belonging to one or more regions comprised or indicated in at least part of the semantic information differently as compared to pixels not belonging to the one or more regions to enhance the accuracy of one or more task neural networks applied to an output of the filter or to data derived from an output of the filter; or the filter processes one or more pixels belonging to one or more regions comprised or indicated in at least part of the semantic information differently than pixels not belonging to the one or more regions to enhance a user viewing experience.

The example method may further include: using the one or more regions comprised or indicated in the semantic information to determine respective one or more subsets of pixels comprised in the set of pixels of the frame, wherein the one or more subsets of pixels correspond spatially to the one or more regions; and providing the one or more subsets of pixels as input to the filter.

The example method may further include: using the one or more regions comprised in the semantic information to determine a subset of pixels comprised in the set of pixels of the frame, wherein the subset of pixels comprises pixels that correspond spatially to the one or more regions and comprise a rectangular shape; and providing the set of pixels as input to the filter.

The example method may further include, wherein the one or more regions comprised or indicated in the semantic information are used to determine which part of the frame to be filtered is to be replaced with one or more outputs of the filter.

The example method may further include applying a post-processing operation to an output of the filter or to data derived from an output of the filter, wherein the post-processing operation is performed based on one or more parameters, and wherein the one or more parameters are predefined, or are signaled from an encoder to a decoder or a receiver.

The example method may further include using a supplemental enhancement information (SEI) message or a regional neural-network post-filter activation SEI message to carry or signal the semantic information for filtering the frames for which a post-filter is activated by the SEI message.

Another example apparatus includes at least one processor; and at least one non-transitory memory storing instructions that, when executed by the at least one processor, cause the apparatus at least to perform: receiving a frame to be filtered; receiving semantic information about the frame to be filtered; and filtering the frame based at least on the semantic information.

The example apparatus may further include, wherein one or more first pixels in the frame are filtered differently from one or more second pixels in the frame, wherein indication of at least one of the one or more first pixels and the one or more second pixels is comprised in the semantic information.

The example apparatus may further include, wherein the semantic information comprises one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The example apparatus may further include, wherein the apparatus is further caused to receive the semantic information from an external source, and wherein when the semantic information is received from the external source, the semantic information is provided directly to a filter or provided to an interface that converts an input signal into a format of semantic information that is accepted by the filter.

The example apparatus may further include, wherein the frame comprises a first subset of frames and a second subset of frames, and wherein the apparatus is further caused to perform: using the semantic information as an input to a filter when filtering the second subset of frames, where the semantic information was determined based on the first subset of frames.

The example apparatus may further include, wherein: a filter processes one or more pixels belonging to one or more regions comprised or indicated in at least part of the semantic information differently as compared to pixels not belonging to the one or more regions to enhance the accuracy of one or more task neural networks applied to an output of a filter or to data derived from the output of the filter; or the filter processes one or more pixels belonging to the one or more regions comprised or indicated in at least part of the semantic information differently from the pixels not belonging to the one or more regions to enhance a user viewing experience.

The example apparatus may further include, wherein the apparatus is further caused to perform: using the one or more regions comprised or indicated in the semantic information to determine respective one or more subsets of pixels comprised in a set of pixels of the frame, wherein the one or more subsets of pixels correspond spatially to the one or more regions; providing the one or more subsets of pixels as input to the filter; and using the one or more regions comprised or indicated in the semantic information to determine which part of the frame to be filtered is to be replaced with one or more outputs of the filter.

The example apparatus may further include, wherein the apparatus is further caused to perform: applying a post-processing operation to the output of the filter or to data derived from the output of the filter, wherein the post-processing operation is performed based on one or more parameters, and wherein the one or more parameters are predefined, or are signaled from an encoder to a decoder or a receiver.

The example apparatus may further include, wherein the apparatus is further caused to perform: receiving one or more supplemental enhancement information (SEI) messages comprising the semantic information; and obtaining the semantic information from the one or more SEI messages.

Another example method includes: receiving a frame to be filtered; receiving semantic information about the frame to be filtered; and filtering the frame based at least on the semantic information.

The example method may further include, wherein one or more first pixels in the frame are filtered differently from one or more second pixels in the frame, wherein indication of at least one of the one or more first pixels and the one or more second pixels is comprised in the semantic information.

The example method may further include, wherein the semantic information comprises one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The example method may further include receiving the semantic information from an external source, and wherein when the semantic information is received from the external source, the semantic information is provided directly to a filter or provided to an interface that converts an input signal into a format of semantic information that is accepted by the filter.

The example method may further include, wherein the frame comprises a first subset of frames and a second subset of frames, and wherein the method further comprises: using the semantic information as an input to a filter when filtering the second subset of frames, where the semantic information was determined based on the first subset of frames.

The example method may further include, wherein: a filter processes one or more pixels belonging to one or more regions comprised or indicated in at least part of the semantic information differently as compared to pixels not belonging to the one or more regions to enhance the accuracy of one or more task neural networks applied to an output of a filter or to data derived from the output of the filter; or the filter processes one or more pixels belonging to the one or more regions comprised or indicated in at least part of the semantic information differently from the pixels not belonging to the one or more regions to enhance a user viewing experience.

The example method may further include: using the one or more regions comprised or indicated in the semantic information to determine respective one or more subsets of pixels comprised in a set of pixels of the frame, wherein the one or more subsets of pixels correspond spatially to the one or more regions; providing the one or more subsets of pixels as input to the filter; and using the one or more regions comprised or indicated in the semantic information to determine which part of the frame to be filtered is to be replaced with one or more outputs of the filter.

The example method may further include applying a post-processing operation to the output of the filter or to data derived from the output of the filter, wherein the post-processing operation is performed based on one or more parameters, and wherein the one or more parameters are predefined, or are signaled from an encoder to a decoder or a receiver.

The example method may further include: receiving one or more supplemental enhancement information (SEI) messages comprising the semantic information; and obtaining the semantic information from the one or more SEI messages.

Yet another example apparatus includes at least one processor; and at least one non-transitory memory storing instructions that, when executed by the at least one processor, cause the apparatus at least to perform: encoding a source frame into a coded frame; deriving semantic information to be used for adapting operations of a filter used for filtering a frame reconstructed from the coded frame, wherein one or more first pixels in the frame are filtered differently from one or more second pixels in the frame; and encoding one or more supplemental enhancement information (SEI) messages comprising the semantic information.

The example apparatus may further include, wherein the semantic information comprises one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

Yet another example method includes: encoding a source frame into a coded frame; deriving semantic information to be used for adapting operations of a filter used for filtering a frame reconstructed from the coded frame, wherein one or more first pixels in the frame are filtered differently from one or more second pixels in the frame; and encoding one or more supplemental enhancement information (SEI) messages comprising the semantic information.

The example method may further include, wherein the semantic information comprises one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

A computer-readable medium encoded with instructions that, when executed by a computer, causing an apparatus to perform methods as described in any of the previous paragraphs.

The computer-readable medium may further include, wherein the computer-readable medium comprises a non-transitory computer-readable medium.

An apparatus comprising means for performing the methods as described in any of the previous paragraphs.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 2:
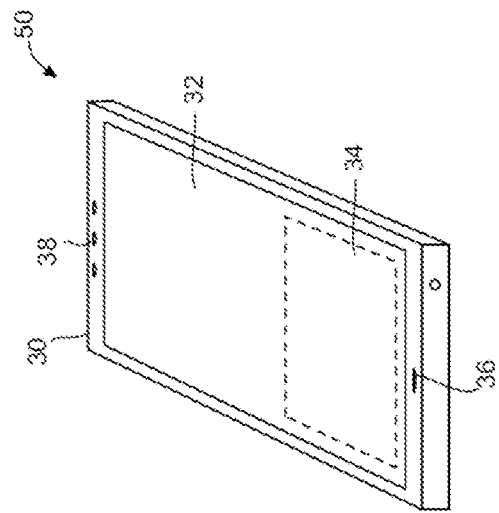
FIG. 2 shows schematically a user equipment suitable for employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network accuracy ACC
AGT approximated ground truth data
AI artificial intelligence
AIoT AI-enabled IoT
ALF adaptive loop filtering
a.k.a. also known as
AMF access and mobility management function
APS adaptation parameter set
AVC advanced video coding
bpp bits-per-pixel
CABAC context-adaptive binary arithmetic coding
CDMA code-division multiple access
CE core experiment
ctu coding tree unit
CU central unit
CVC conventional video codec
DASH dynamic adaptive streaming over HTTP
DCT discrete cosine transform
DCI decoding compatibility information
DSP digital signal processor
DSNN decoder-side NN
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
FDC finetuning-driving content
gNB (or gNodeB) base station for 5G/NR, for example, a node providing NR user plane and control plane protocol terminations towards the UE, and connected via the NG interface to the 5GC
GSM Global System for Mobile communications
GT ground truth
H.222.0 MPEG-2 Systems is formally known as ISO/IEC 13818-1 and as ITU-T Rec. H.222.0
H.26x family of video coding standards in the domain of the ITU-T
HLS high level syntax
HQ high-quality
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
IRAP intra random access point
ISO International Organization for Standardization
ISOBMFF ISO base media file format
ITU International Telecommunication Union
ITU-T ITU Telecommunication Standardization Sector
JPEG joint photographic experts group
LCVC lossy conventional video codec
LIC learned image compression
LL-CVC lossless conventional video codec
LMCS luma mapping with chroma scaling
LPNN loss proxy NN
LQ low-quality
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
MSE Mean-squared error
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
OBU open bitstream unit
ONNX Open Neural Network eXchange
PB protocol buffers
PC personal computer
PDA personal digital assistant
PDCP packet data convergence protocol
PHY physical layer
PID packet identifier
PLC power line communication
PNG portable network graphics
PSNR peak signal-to-noise ratio
RA Random access
RAM random access memory
RAN radio access network
RBSP raw byte sequence payload
RD loss rate distortion loss
RFC request for comments
RFID radio frequency identification
RLC radio link control
RRC radio resource control
RRH remote radio head
RU radio unit
Rx receiver
SDAP service data adaptation protocol
SGD Stochastic Gradient Descent
SGW serving gateway
SMF session management function
SMS short messaging service
SPS sequence parameter set
st (v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TUC technology under consideration TV television
Tx transmitter
UE user equipment
ue (v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VPS video parameter set
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data,' 'content,' 'information,' and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium,' which refers to a non-transitory physical storage medium (e.g., volatile or non-volatile memory device), can be differentiated from a computer-readable transmission medium,' which refers to an electromagnetic signal.

A method, apparatus and computer program product are provided in accordance with example embodiments for region-based filtering.

Figure 1:
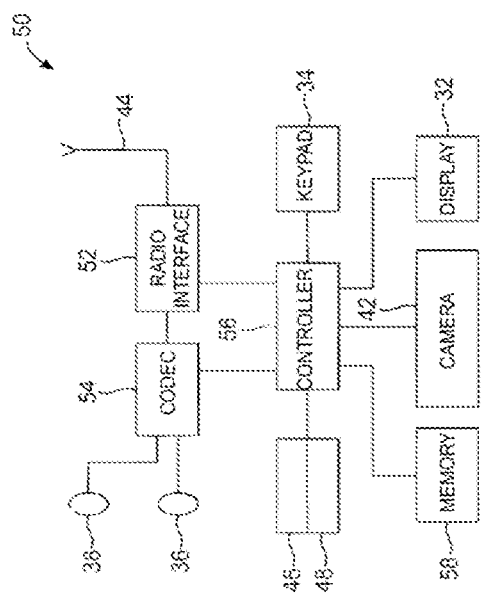
FIG. 1 shows schematically an electronic device employing embodiments of the examples described herein.

In an example, the following describes in detail suitable apparatus and possible mechanisms for implementing region-based filtering. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data and video data, and/or may also store instructions for implementation on the controller 56. The controller 56 may further be connected to codec circuitry 54 suitable for carrying out coding and/or decoding of audio, image and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network.

The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec circuitry 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

*Fundamentals* of Neural Networks

A neural network (NN) is a computation graph consisting of several layers of computation. Each layer consists of one or more units, where each unit performs a computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Couple of examples of architectures for neural networks are feed-forward and recurrent architectures. Feed-forward neural networks are such that there is no feedback loop, each layer takes input from one or more of the previous layers, and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

One of the properties of neural networks, and other machine learning tools, is that they are able to learn properties from input data, either in a supervised way or in an unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output error, also referred to as the loss. Examples of losses are mean squared error, cross-entropy, and the like. In recent deep learning techniques, training is an iterative process, where at each iteration the algorithm modifies the weights of the neural network to make a gradual improvement in the network's output, for example, gradually decrease the loss.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following:

when the network is learning at all—in this case, the training set error should decrease, otherwise the model is in the regime of underfitting.

when the network is learning to generalize—in this case, also the validation set error needs to decrease and be not too much higher than the training set error. For example, the validation set error should be less than 20% higher than the training set error. If the training set error is low, for example 10% of its value at the beginning of training, or with respect to a threshold that may have been determined based on an evaluation metric, but the validation set error is much higher than the training set error, or it does not decrease, or it even increases, the model is in the regime of overfitting. This means that the model has just memorized properties of the training set and performs well only on that set, but performs poorly on a set not used for training or tuning of its parameters.

While the above information on neural networks may be valid at the time of drafting this document, the field of neural networks and machine learning in general is developing at a fast pace. Thus, it is to be understood that at least some of the embodiments described herein are not limited to the definition of a neural network, or a machine learning model, or a training algorithm that was given in the background information above.

Lately, neural networks have been used for compressing and de-compressing data such as images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have been obtained by a binarization or quantization process after the encoder. The decoder takes in this code and reconstructs the image which was input to the encoder.

Such encoder and decoder are usually trained to minimize a combination of bitrate and distortion, where the distortion may be based on one or more of the following metrics: mean squared error (MSE), peak signal-to-noise ratio (PSNR), structural similarity index measure (SSIM), or the like. These distortion metrics are meant to be correlated to the human visual perception quality, so that minimizing or maximizing one or more of these distortion metrics results into improving the visual quality of the decoded image as perceived by humans.

In various embodiments, terms 'model', 'neural network', 'neural net' and 'network' may be used interchangeably, and also the weights of neural networks may be sometimes referred to as learnable parameters or as parameters.

Some Video Coding and Video Metadata Specifications

The Advanced Video Coding standard (which may be abbreviated H.264, AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated H.265, HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Versatile Video Coding (which may be abbreviated VVC, H.266, or H.266/VVC) is a video compression standard developed as the successor to HEVC. VVC is specified in ITU-T Recommendation H.266 and equivalently in ISO/IEC 23090-3, which is also referred to as MPEG-I Part 3.

A specification of the AV1 bitstream format and decoding process were developed by the Alliance for Open Media (AOM). The AV1 specification was published in 2018. AOM is reportedly working on the AV2 specification.

ITU-T Recommendation H.274, which is equivalent to ISO/IEC 23002-7, may be called "versatile supplemental enhancement information messages for coded video bitstreams" and be referred to as "versatile supplemental enhancement information" or VSEI. The VSEI standard specifies the syntax and semantics of video usability information (VUI) parameters and supplemental enhancement information (SEI) messages. The VUI parameters and SEI messages defined in the VSEI standard are designed to be conveyed within coded video bitstreams in a manner specified in a video coding specification or to be conveyed by other means determined by the specifications for systems that make use of such coded video bitstreams. The VSEI standard is intended for use with VVC coded video bitstreams, although it is drafted in a manner intended to be sufficiently generic that it may also be used with other types of coded video bitstreams. VUI parameters and SEI messages may, for example, assist in processes related to decoding, display or other purposes.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at a lower bitrate.

Typical hybrid video codecs, for example ITU-T H.263 and H.264, encode the video information in two phases. Firstly, pixel values in a certain picture area (or 'block') are predicted, for example, by motion compensation means or circuits (by finding and indicating an area in one of the previously coded video frames that corresponds closely to the block being coded) or by spatial means or circuit (by using the pixel values around the block to be coded in a specified manner). Secondly, the prediction error, e.g. the difference between the predicted block of pixels and the original block of pixels, is coded. This is typically done by transforming the difference in pixel values using a specified transform (e.g. discrete cosine transform (DCT) or a variant of it), quantizing the coefficients and entropy coding the quantized coefficients. By varying the fidelity of the quantization process, the encoder may control the balance between the accuracy of the pixel representation (e.g., picture quality) and size of the resulting coded video representation (e.g., file size or transmission bitrate).

In other example, the pixel values may be predicted by using spatial prediction techniques. This prediction technique uses the pixel values around the block to be coded in a specified manner. Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra-coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain. After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures.

In order to represent motion vectors efficiently, the motion vectors are typically coded differentially with respect to block specific predicted motion vectors. In typical video codecs, the predicted motion vectors are created in a predefined way, for example, calculating the median of the encoded or decoded motion vectors of the adjacent blocks.

Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture.

Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired macroblock mode and associated motion vectors. This kind of cost function uses a weighting factor λ to tie together the exact or estimated image distortion due to lossy coding methods and the exact or estimated amount of information that is required to represent the pixel values in an image area:

$$C = D + \lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

An out-of-band transmission, signaling, or storage may refer to the capability of transmitting, signaling, or storing information in a manner that associates the information with a video bitstream. The out-of-band transmission may use a more reliable transmission mechanism compared to the protocols used for carrying coded video data, such as slices. The out-of-band transmission, signaling or storage may additionally or alternatively be used, e.g., for ease of access or session negotiation. For example, a sample entry of a track in a file conforming to the ISO Base Media File Format may comprise parameter sets, while the coded data in the bitstream is stored elsewhere in the file or in another file. Another example of out-of-band transmission, signaling, or storage comprises including information, such as NN and/or NN updates in a file format track that is separate from track(s) including coded video data.

The phrase along the bitstream (e.g., indicating along the bitstream) or along a coded unit of a bitstream (e.g., indicating along a coded tile) may be used in claims and described embodiments to refer to transmission, signaling, or storage in a manner that the 'out-of-band' data is associated with, but not included within, the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is included in a container file, such as a file conforming to the ISO Base Media File Format, and certain file metadata is stored in the file in a manner that associates the metadata to the bitstream, such as boxes in the sample entry for a track including the bitstream, a sample group for the track including the bitstream, or a timed metadata track associated with the track including the bitstream. In another example, the phrase along the bitstream may be used when the bitstream is made available as a stream over a communication protocol and a media description, such as a streaming manifest, is provided to describe the stream.

A bitstream may be defined as a sequence of bits or a sequence of syntax structures. A bitstream format may constrain the order of syntax structures in the bitstream.

A syntax element may be defined as an element of data represented in a bitstream. A syntax structure may be defined as zero or more syntax elements present together in a bitstream in a specified order.

Syntax structures may be specified, for example, using arithmetic, logical, relational, bit-wise, and assignment operators similar to those available in many programming languages. For example, & may indicate a bit-wise 'AND' operation. Furthermore, syntax structures may be specified with reference to mathematical functions.

Syntax structures and semantics may use the values of variables derived from the values of syntax elements. Naming conventions may be defined for variables. For example, variables may be named by a mixture of lower case and upper case letter and without any underscore characters. Variables starting with an upper case letter may be derived for the decoding of the current syntax structure and all depending syntax structures. Variables starting with an upper case letter may, in some cases, be used in the decoding process for later syntax structures without mentioning the originating syntax structure of the variable. Variables starting with a lower case letter may only be used in relation to the syntax structure or function they have been defined for.

An elementary unit for the output of a video encoder and the input of a video decoder, respectively, may be a network abstraction layer (NAL) unit. For transport over packet-oriented networks or storage into structured files, NAL units may be encapsulated into packets or similar structures. A bytestream format encapsulating NAL units may be used for transmission or storage environments that do not provide framing structures. The bytestream format may separate NAL units from each other by attaching a start code in front of each NAL unit. To avoid false detection of NAL unit boundaries, encoders may run a byte-oriented start code emulation prevention algorithm, which may add an emulation prevention byte to the NAL unit payload, when a start code would have occurred otherwise. In order to enable straightforward gateway operation between packet and stream-oriented systems, start code emulation prevention may be performed regardless of whether the bytestream format is in use or not. A NAL unit may be defined as a syntax structure including an indication of the type of data to follow and bytes including that data in the form of a raw byte sequence payload interspersed as necessary with emulation prevention bytes. A raw byte sequence payload (RBSP) may be defined as a syntax structure including an integer number of bytes that is encapsulated in a NAL unit. An RBSP is either empty or has the form of a string of data bits including syntax elements followed by an RBSP stop bit and followed by zero or more subsequent bits equal to 0.

A bitstream may be defined to logically include a syntax structure, such as a NAL unit, when the syntax structure is transmitted along the bitstream but may be included in the bitstream according to the bitstream format. A bitstream may be defined to natively comprise a syntax structure, when the bitstream includes the syntax structure.

In some coding formats or standards, a bitstream may be in the form of a network abstraction layer (NAL) unit stream or a byte stream, that forms the representation of coded pictures and associated data forming one or more coded video sequences.

In some formats or standards, a first bitstream may be followed by a second bitstream in the same logical channel, such as in the same file or in the same connection of a communication protocol. An elementary stream (in the context of video coding) may be defined as a sequence of one or more bitstreams.

In some coding formats, such as AV1, a bitstream may comprise a sequence of open bitstream units (OBUs). An OBU comprises a header and a payload, wherein the header identifies a type of the OBU. Furthermore, the header may comprise a size of the payload in bytes.

In some coding standards, NAL units include a header and payload. The NAL unit header indicates the type of the NAL unit. In some coding standards, the NAL unit header indicates a scalability layer identifier (e.g., called nuh_layer_id in H.265/HEVC and H.266/VVC), which may be used, e.g., for indicating spatial or quality layers, views of a multiview video, or auxiliary layers (such as depth maps or alpha planes). In some coding standards, the NAL unit header includes a temporal sublayer identifier, which may be used for indicating temporal subsets of the bitstream, such as a 30-frames-per-second subset of a 60-frames-per-second bitstream.

Bitstreams or coded video sequences may be encoded to be temporally scalable as follows. Each picture may be assigned to a particular temporal sub-layer. A temporal sub-layer may be equivalently called a sub-layer, temporal sublayer, sublayer, or temporal level. Temporal sub-layers may be enumerated, e.g., from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

Each picture of a temporally scalable bitstream may be assigned with a temporal identifier (also known as temporal layer identifier, temporal sublayer identifier, or temporal layer ID), which may be, for example, assigned to a variable TemporalId. The temporal identifier may, for example, be indicated in a NAL unit header or in an OBU extension header. TemporalId equal to 0 corresponds to the lowest temporal level. The bitstream created by excluding all coded pictures having a TemporalId greater than or equal to a selected value and including all other coded pictures remains conforming. Consequently, a picture having TemporalId equal to tid_value does not use any picture having a TemporalId greater than tid_value as a prediction reference.

NAL units may be categorized into Video Coding Layer (VCL) NAL units and non-VCL NAL units. VCL NAL units are typically coded slice NAL units.

A non-VCL NAL unit may be, for example, one of the following types: a video parameter set (VPS), a sequence parameter set (SPS), a picture parameter set (PPS), an adaptation parameter set (APS), a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Video coding specifications may enable the use of supplemental enhancement information (SEI) messages or alike. Some video coding specifications include SEI NAL units, and some video coding specifications include both prefix SEI NAL units and suffix SEI NAL units, where the former type can start a picture unit or alike and the latter type may end a picture unit or alike. An SEI NAL unit includes one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266/VVC, and H.274/VSEI standards, and the user data SEI messages enable organizations and companies to specify SEI messages for their own use. The standards may include the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Some video coding specifications enable metadata OBUs. A metadata OBU comprises a type field, which specifies the type of metadata.

A coded video sequence (CVS) may be defined as a sequence of coded pictures in decoding order that is independently decodable and is followed by another coded video sequence or the end of the bitstream.

A coded layer video sequence (CLVS) may be defined as a sequence of pictures and associated other data within the same scalable layer (e.g., with the same value of nuh_layer_id in VVC) that is decodable independently of other pictures in the same layer.

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance. The variable including a POC value of a picture may be referred to as PicOrderCntVal.

An identifier may be defined as a syntax element that identifies a syntax structure. A value of the identifier may for example differ in different instances of the same syntax structure, such as a parameter set. A particular instance of the syntax structure may be referenced through its identifier value. For example, a parameter set that is referenced by the (de) coding of a coded video slice may be identified by providing the identifier value of the parameter set in a header of the coded video slice.

An indicator (idc) may be defined as a syntax element whose value indicates a selection among more than two values (for which semantics have been specified). An indicator syntax element may have _idc postfix in its name.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Images can be split into independently codable and decodable image segments (e.g., slices or tiles or tile groups). Such image segments may enable parallel processing. Image segments may be coded as separate units in the bitstream, such as VCL NAL units in H.264/AVC, HEVC, and VVC. Coded image segments may comprise a header and a payload, wherein the header includes parameter values needed for decoding the payload.

In some video coding formats, such as HEVC and VVC, a picture is divided into one or more tile rows and one or more tile columns. A tile is a sequence of coding tree units (CTU) that covers a rectangular region of a picture. The partitioning to tiles forms a grid that may be characterized by a list of tile column widths (in CTUs) and a list of tile row heights (in CTUs). For encoding and/or decoding, the CTUs in a tile are scanned in raster scan order within that tile. In HEVC, tiles are ordered in the bitstream consecutively in the raster scan order of the tile grid.

In some video coding formats, such as AV1, a picture may be partitioned into tiles, and a tile consists of an integer number of complete superblocks that collectively form a complete rectangular region of a picture. In-picture prediction across tile boundaries may be disabled. The minimum tile size may be one superblock, and the maximum tile size in the presently specified levels in AV1 is 4096×2304 in terms of luma sample count. The picture is partitioned into a tile grid of one or more tile rows and one or more tile columns. The tile grid may be signaled in the picture header to have a uniform tile size or nonuniform tile size, where in the latter case the tile row heights and tile column widths are signaled. The superblocks in a tile are scanned in raster scan order within that tile.

In some video coding formats, such as VVC, a slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

In some video coding formats, such as VVC, two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

In HEVC, a slice consists of an integer number of CTUs. The CTUs are scanned in the raster scan order of CTUs within tiles or within a picture, if tiles are not in use. A slice may contain an integer number of tiles, or a slice can be contained in a tile.

In some video coding formats, such as AV1, a tile group OBU carries one or more complete tiles. The first and last tiles of in the tile group OBU may be indicated in the tile group OBU before the coded tile data. Tiles within a tile group OBU may appear in a tile raster scan of a picture.

In some video coding formats, such as VVC, a subpicture may be defined as a rectangular region of one or more slices within a picture, wherein the one or more slices are complete. Thus, a subpicture consists of one or more slices that collectively cover a rectangular region of a picture. Consequently, each subpicture boundary is also always a slice boundary, and each vertical subpicture boundary is always also a vertical tile boundary. The slices of a subpicture may be required to be rectangular slices. One or both of the following conditions may be required to be fulfilled for each subpicture and tile: i) all CTUs in a subpicture belong to the same tile; ii) All CTUs in a tile belong to the same subpicture.

Scalable Video Coding

A scalable bitstream may include a 'base layer' providing the lowest quality video available and one or more enhancement layers that enhance the video quality when received and decoded together with the lower layers. In order to improve coding efficiency for the enhancement layers, the coded representation of that layer may depend on the lower layers. E.g., the motion and mode information of the enhancement layer can be predicted from lower layers. Similarly, the pixel data of the lower layers can be used to create prediction for the enhancement layer.

A scalable video codec for quality scalability (also known as signal-to-noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use, e.g., with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e., have fewer samples) than enhancement layer pictures. Spatial scalability and quality scalability may sometimes be considered the same type of scalability.

Bit-depth scalability: Base layer pictures are coded at lower bit-depth (e.g., 8 bits) than enhancement layer pictures (e.g., 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g., coded in 4:2:0 chroma format) than enhancement layer pictures (e.g., 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents a spatial subset of the base layer. ROI scalability may be used together with other types of scalabilities, e.g., quality or spatial scalability so that the enhancement layer provides higher subjective quality for the spatial subset.

View scalability, which may also be referred to as multiview coding. The base layer represents a first set of views, whereas an enhancement layer represents a second set of views.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

In ROI scalability, spatial correspondence of an ROI enhancement layer in relation to its reference layer(s) is indicated. In VVC, scaling windows can be used to indicate this spatial correspondence.

It has been proposed, e.g. in JVET-O1150 (https://www.jvet-experts.org/doc_end_user/documents/15_Gothenburg/wg11/JVET-O1150-v2.zip), that temporal sublayers could be used for any type of scalability. A mapping of scalability dimensions to sublayer identifiers could be provided e.g. in a VPS or in an SEI message.

Neural-Network Post-Filter Characteristics (NNPFC) and Neural-Network Post-Filter Activation (NNPFA) SEI Messages The neural-network post-filter characteristics (NNPFC) SEI message and the neural-network post-filter activation (NNPFA) SEI message have been described in document JVET-AB2006.

The NNPFC SEI message comprises the nnpfc_id syntax element, which includes an identifying number that may be used to identify a post-processing filter. A base post-processing filter is the filter that is included in or identified by the first NNPFC SEI message, in decoding order, that has a particular nnpfc_id value within a coded layer video sequence (CLVS). When there is a second NNPFC SEI message that has the same nnpfc_id value that defines the base post-processing filter, an update relative to the base post-processing filter is applied to obtain a post-processing filter associated with the nnpfc_id value. The update may be obtained by decoding the coded neural network bitstream in the second NNPFC SEI message. Otherwise, the post-processing filter associated with the nnpfc_id value is assigned to be the same as the base post-processing filter.

The NNPFC SEI message comprises nnpfc_mode_idc syntax element, the semantics of which may be defined as follows:

nnpfc_mode_idc equal to 1 specifies that the base post-processing filter or the update relative to the base post-processing filter associated with the nnpfc_id value is a neural network identified by the Uniform Resource Identifier (URI) nnpfc_uri with the format identified by the tag URI nnpfc_tag_uri.

nnpfc_mode_idc equal to 0 indicates that this SEI message includes an ISO/IEC 15938-17 bitstream that specifies the base post-processing filter or updates relative to the base post-processing filter with the same nnpfc_id value.

The NNPFC SEI message may also comprise:
Purpose of the post-processing filter (nnpfc_purpose), which may comprise, for example, one or more of the following:
  Determined by the application (nnpfc_purpose equal to 0)
  Visual quality improvement
  Chroma upsampling from the 4:2:0 chroma format to the 4:2:2 or 4:4:4 chroma format, or from the 4:2:2 chroma format to the 4:4:4 chroma format
  Increasing the width or height of the input picture(s)
  Frame rate upsampling
  Bit depth upsampling
  Colorization
Formatting of the input tensors that are given as input to the neural network inference
Formatting of the output tensors that are resulting from the neural network inference
Characterization of the complexity of the neural network The NNPFA SEI message specifies the neural-network post-processing filter that may be used for post-processing filtering for the current picture, or for post-processing filtering for the current picture and one or more other pictures. The NNPFA SEI message comprises the nnpfa_target_id syntax element, which indicates that the neural-network post-processing filter with nnpfc_id equal to nnfpa_target_id may be used for post-processing filtering for the indicated persistence. The indicated persistence may be the current picture only (nnpfa_persistence_flag equal to 0), or until the end of the current coded layer video sequence (CLVS) or the next picture, in output order, in the current layer associated with a NNPFA SEI message with the same nnpfa_target_id as the current SEI message (nnpfa_persistence_flag equal to 1).

SEI Processing Order

The SEI processing order SEI message has been described in document JVET-AA2027. The SEI processing order SEI message carries information indicating the preferred processing order, as determined by the encoder (i.e., the content producer), for different types of SEI messages that may be present in the bitstream. When an SEI processing order SEI message is present, it is present in the first access unit of the coded video sequence (CVS). The SEI processing order SEI message persists in decoding order from the current access unit until the end of the CVS. The SEI processing order SEI message comprises a list of pairs, each pair comprising a SEI payload type value po_sei_payload_type[i] and a processing order value po_sei_processing_order[i]. po_sei_payload_type[i] specifies the value of payloadType for the i-th SEI message for which information is provided in the SEI processing order SEI message. po_sei_processing_order[i] indicates the preferred order of processing any SEI message with payloadType equal to po_sei_payload_type[i]. po_sei_processing_order[m] greater than 0 and less than po_sei_processing_order[n] indicates any SEI message with payloadType equal to po_sei_payload_type[m], when present, should be processed before any SEI message with payloadType equal to po_sei_payload_type[n], when present. po_sei_processing_order[m] greater than 0 and equal to po_sei_processing_order[n] indicates that the preferred order of processing of SEI messages with payloadTypes equal to po_sei_payload_type[m] and po_sei_payload_type[n] is unknown or unspecified or determined by external means not specified in this Specification. po_sei_processing_order[i] equal to 0 specifies that the preferred order of processing SEI messages with payloadType equal to po_sei_payload_type[i] is unknown or unspecified or determined by external means.

Annotated Regions SEI Message

The annotated regions SEI message has been specified in the VSEI standard (ISO/IEC 23002-7|ITU-T H.274) as well as in HEVC (ISO/IEC 23008-2|ITU-T H.265). In the following, the syntax element names refer to the VSEI definition of the annotated regions SEI message.

The annotated regions SEI message carries parameters that identify annotated regions using bounding boxes representing the size and location of identified objects.

The annotated regions SEI message may comprise, but may not be limited to, one or more pieces of the following information:
  ar_not_optimized_for_viewing_flag equal to 1 indicates that the decoded pictures that the annotated regions SEI message applies to are not optimized for user viewing, but rather are optimized for some other purpose such as algorithmic object classification performance. ar_not_optimized_for_viewing_flag equal to 0 indicates that the decoded pictures that the annotated regions SEI message applies to may or may not be optimized for user viewing.
  ar_true_motion_flag equal to 1 indicates that the motion information in the coded pictures that the annotated regions SEI message applies to was selected with a goal of accurately representing object motion for objects in the annotated regions. ar_true_motion_flag equal to 0 indicates that the motion information in the coded pictures that the annotated regions SEI message applies to may or may not have been selected with a goal of accurately representing object motion for objects in the annotated regions.
  ar_occluded_object_flag equal to 1 indicates that each of the bounding boxes represents the size and location of an object or a portion of an object that may not be visible or may be only partially visible within the cropped decoded picture that the annotated regions SEI message applies to. ar_occluded_object_flag equal to 0 indicates that each of the bounding boxes represents the size and location of an object that is entirely visible within the cropped decoded picture that the annotated regions SEI message applies to.
  Textual labels, which are assigned indices.
  A language used in the labels.
  A mapping of an object to a label index.
  A bounding box of an object.
  An indication of whether the bounding box represents the size and location of an object that is only partially visible within the cropped decoded picture.
  A degree of confidence associated with an object.

Information on Video Coding for Machines (VCM)

Reducing the distortion in image and video compression is often intended to increase human perceptual quality, as humans are considered to be the end users, e.g. consuming or watching the decoded images or videos. Recently, with the advent of machine learning, especially deep learning, there is a rising number of machines (e.g., autonomous agents) that analyze or process data independently from humans and may even take decisions based on the analysis results without human intervention. Examples of such analysis are object detection, scene classification, semantic segmentation, video event detection, anomaly detection, pedestrian tracking, and the like. Example use cases and applications are self-driving cars, video surveillance cameras and public safety, smart sensor networks, smart TV and smart advertisement, person re-identification, smart traffic monitoring, drones, and the like. Accordingly, when decoded data is consumed by machines, a quality metric for the decoded data may be defined, which may be different from a quality metric for human perceptual quality. Also, dedicated algorithms for compressing and decompressing data for machine consumption may be different than those for compressing and decompressing data for human consumption. The set of tools and concepts for compressing and decompressing data for machine consumption is referred to here as Video Coding for Machines.

It is likely that the receiver-side may has multiple 'machines' or neural networks (NNs). These multiple machines may be used in a certain combination which is for example determined by an orchestrator sub-system. The multiple machines may be used for example in temporal succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of objects in the frames.

The term 'receiver-side' or 'decoder-side' may refer to a physical or abstract entity or device which includes one or more machines, and runs these one or more machines on some encoded and eventually decoded video representation which is encoded by another physical or abstract entity or device, the 'encoder-side device'

The encoded video data may be stored into a memory device, for example as a file. The stored file may later be provided to another device.

Alternatively, the encoded video data may be streamed from one device to another.

Alternatively, the encoded video data may be streamed from one device to another.

Figure 3:
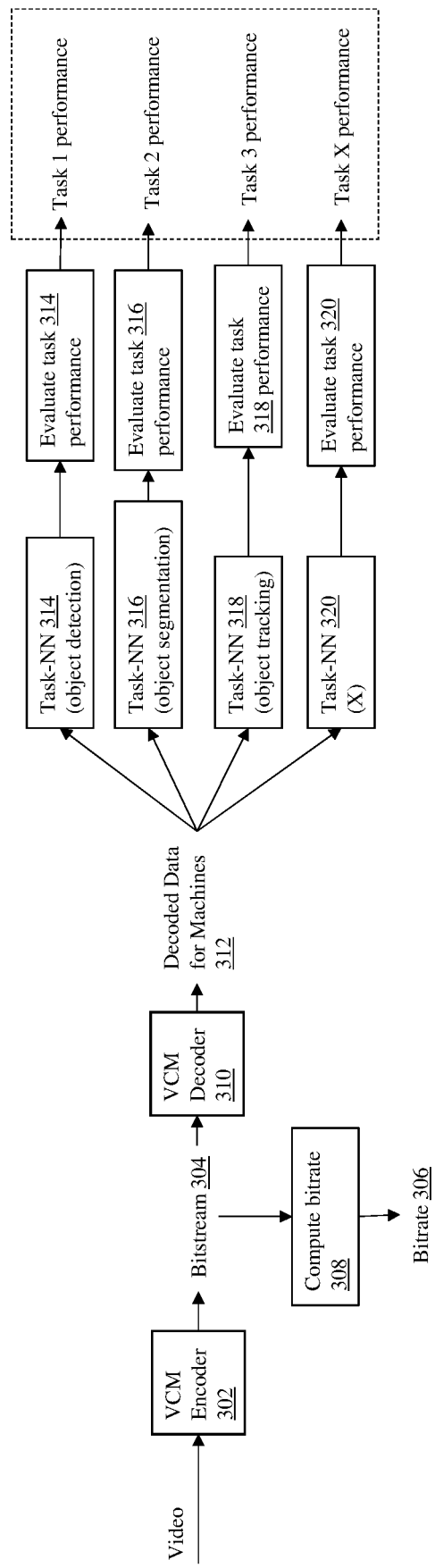
FIG. 3 illustrates a pipeline of video coding for machines (VCM), in accordance with an embodiment.

FIG. 3 illustrates a pipeline of video coding for machines (VCM), in accordance with an embodiment. A VCM encoder 302 encodes the input video into a bitstream 304. A bitrate 306 may be computed 308 from the bitstream 304 in order to evaluate the size of the bitstream 304. A VCM decoder 310 decodes the bitstream 304 output by the VCM encoder 302. An output of the VCM decoder 310 may be referred, for example, as decoded data for machines 312. This data may be considered as the decoded or reconstructed video. However, in some implementations of the pipeline of VCM, the decoded data for machines 312 may not have same or similar characteristics as the original video which was input to the VCM encoder 302. For example, this data may not be easily understandable by a human, if the human watches the decoded video from a suitable output device such as a display. The output of the VCM decoder 310 is then input to one or more task neural network (task-NN). For the sake of illustration, FIG. 3 is shown to include three example task-NNs, a task-NN 314 for object detection, a task-NN 316 for image segmentation, a task-NN 318 for object tracking, and a non-specified one, a task-NN 320 for performing task X. The goal of VCM is to obtain a low bitrate while guaranteeing that the task-NNs still perform well in terms of the evaluation metric associated with each task.

When a conventional video encoder, such as a H.266/VVC encoder, is used as a VCM encoder, one or more of the following approaches may be used to adapt the encoding to be suitable to machine analysis tasks:

One or more regions of interest (ROIs) may be detected. An ROI detection method may be used. For example, ROI detection may be performed using a task NN, such as an object detection NN. In some cases, ROI boundaries of a group of pictures or an intra period may be spatially overlaid and rectangular areas may be formed to cover the ROI boundaries. The detected ROIs (or rectangular areas, likewise) may be used in one or more of the following ways:

The quantization parameter (QP) may be adjusted spatially in a manner that ROIs are encoded using finer quantization step size(s) than other regions. For example, QP may be adjusted CTU-wise.

The video is preprocessed to contain only the ROIs, while the other areas are replaced by one or more constant values or removed.

A grid is formed in a manner that a single grid cell covers a ROI. Grid rows or grid columns that contain no ROIs are downsampled as preprocessing to encoding.

Quantization parameter of the highest temporal sublayer(s) is increased (e.g., coarser quantization is used) when compared to practices for human watchable video.

The original video is temporally downsampled as preprocessing prior to encoding. A frame rate upsampling method may be used as postprocessing subsequent to decoding, when machine analysis at the original frame rate is desired.

A filter is used to preprocess the input to the conventional encoder. The filter may be a machine learning based filter, such as a convolutional neural network.

An example problem addressed by at least some of the embodiments concerns how to perform filtering of data, such as decoded image data, in such a way that the filtered data is more suitable as input to a machine analysis task, e.g., the machine analysis task would perform better on the filtered data than on the unfiltered data.

Another example problem addressed by at least some of the embodiments concerns how to enable performing filtering of data, such as decoded image data, in such a way that the filtered data is more suitable as input to a machine analysis task, e.g., the machine analysis task would perform better on the filtered data than on the unfiltered data. For example, at least some of the embodiments concern information that may be signaled from an encoder to a decoder or receiver, where the information may be used by the decoder or receiver as part of the filtering process.

In an embodiment, a semantic information is provided as an input to a filter, in addition to the image that is to be filtered.

The semantic information may be determined at encoder side, at decoder side, or may be provided externally. When the semantic information is determined at encoder side, the semantic information may be signaled to the decoder side.

The semantic information may be used by the filter to adapt the filtering operation.

The semantic information may comprise a mask, such as a pixel-wise mask or bounding boxes.

The filter may filter pixels associated to different semantic information in a different way, in a different manner, by using different process, or by using different technique, for example, with different filtering strengths, or by applying different processing operations.

An embodiment describes a filter that is used for filtering input data to obtain filtered data. As a way of example of a filter, in at least some of the present embodiments we consider a post-processing filter (or postfilter); however, it is to be understood that at least some of the present embodiments may be applied to the case where a filter is not a postfilter. Also, as a way of example of input data, we consider image data (which may be referred to also as image, frame, video, and the like).

The postfilter may comprise one or more neural networks, and zero or more other operations. In one example, the postfilter comprises one convolutional neural network, that includes one or more convolutional layers, and one or more non-linear activation layers.

A postfilter may take as input a decoded frame, which is output by a video decoder such as a decoder that conforms to the H.266/VVC standard specification. Alternatively, the postfilter may take as input data that is derived from a decoded frame, such as a frame that has been filtered by another filter.

The output of the postfilter, e.g., a filtered frame, may be input to one or more machine analysis tasks. Alternatively, data derived from the output of the postfilter, such as a frame that has been filtered further by another postfilter and/or undergone colour space conversion, may be input to one or more machine analysis tasks. A machine analysis task may be referred here to as 'machine analysis tasks of interest', or simply 'tasks of interest'. A machine analysis task may, for example, comprise a neural network.

In one embodiment, the postfilter receives the frame to be filtered and semantic information as input. Semantic information may comprise data describing one or more semantic features of the input frame and/or of other frames. Examples of semantic features may include, but may not be limited to, the following:

Position and size information of one or more regions present in the input image that are to be treated specifically by the postfilter. For example, bounding box (es), which may, for instance, be represented as two position coordinates, a vertical size and a horizontal size;

Position and size information of one or more objects present in the input image. For example, bounding box(es), which may, for instance, be represented as two position coordinates, a vertical size and a horizontal size;

Contour or silhouette or shape of one or more objects present in the input image. For example, a binary mask, i.e., a matrix with same height and width as the input image and whose elements can take one of two predetermined values, where one value indicates the presence of an object in the input image at the corresponding position and where another value indicates the absence of an object in the input image at the corresponding position;

Information about the class or category to which an object belongs. For example, a class index for each pixel, or for each bounding box;

Textual object label. Additionally, a language of the object label may be indicated or pre-defined;

Instance identity, which identifies a specific object. For example, an index for each pixel, or for each bounding box, where the values of the index associated to the pixels of the same object take the same value;

Confidence, which may be associated with the semantic information in general and/or any individual piece of semantic information, such as confidence of an object class. Confidence may have a certain range, such as from 0.0 to 1.0, inclusive, where 0.0 indicates the lowest confidence and 1.0 indicates the highest confidence. The confidence may be informative of how confident or how reliable associated semantic information is; and/or Saliency or importance, which may be associated with the semantic information in general and/or any individual piece of the semantic information, such as the saliency score of an object class.

Semantic information may additionally comprise or be accompanied by data describing a coded representation of the input frame and/or of other frames. Examples of such data may include, but may not be limited to, the following:

Spatial partitioning of the input frame to image segments, such as subpictures, slices, and/or tiles;

Quantization Parameter (QP), at one or more levels of partitioning the bitstream, such as a sequence-level QP, a picture-level QP, and/or slice-level QP;

Slice type, e.g., one of the following: I, P, or B, where
an I slice may be defined as a slice that is decoded using intra prediction only,
a P slice may be defined as a slice that is decoded using intra prediction or using inter prediction with at most one motion vector and reference index to predict the sample values of each block, and
a B slice may be defined as a slice that is decoded using intra prediction or using inter prediction with at most two motion vectors and reference indices to predict the sample values of each block;

Information about the temporal layer in a temporal prediction hierarchy.

In an embodiment, different features of the semantic information may be combined into one or more channels of an input tensor used as input to a neural-network postfilter. The one or more channels may be referred to as additional channels, or auxiliary channels. For example, an auxiliary channel may comprise a two-dimensional array with dimensions equal to the width and height of the luma sample array where each array element in the auxiliary channel is a real value, where the integer part represents an instance identity (where 0 may represent no instance identity) of the respective luma sample location and the decimal part represents a confidence of the respective luma sample being mapped to the instance. In another example, a channel may comprise a two-dimensional array with dimensions equal to the width and height of the luma sample array where each array element is a real value, where the integer part represents a class index of the respective luma sample location and the decimal part represents a confidence of the respective luma sample being mapped to the class index. In another example, a channel may comprise a two-dimensional array with dimensions equal to the width and height of the luma sample array where each element in the auxiliary channel is the product of the confidence score and the saliency score of the corresponding location of the element.

In an embodiment, different features of the semantic information may be input to a neural network postfilter in other places than the usual input of a neural network, which is the first layer. For example, the different features of the semantic information may be input at every layer of the neural network postfilter, so that the different features or data derived from different features are used for modifying the layer to which they are input or for modifying one or more outputs of the layer to which they are input.

In one example, semantic information comprises one or more bounding boxes representing persons that are present in the input frame. In another example, semantic information comprises one or more bounding boxes representing persons that are present in one of the previous frames, in output or displaying order.

The semantic information may be used by the filter to adapt the filtering operation.

The filter may filter pixels associated to different semantic information in a different way, such as with different filtering strengths, or by applying different processing operations.

In one embodiment, the use of the semantic information within the filter may be determined by the weights of the filter that were trained during a training process. In another embodiment, the use of the semantic information within the filter may be determined by a set of rules defined by a designer of the filtering process.

In one embodiment, the filter may process pixels belonging to one or more regions (comprised in at least part of the semantic information) differently than pixels not belonging to the one or more regions to enhance the accuracy of one or more task neural networks applied to an output of the filter or to data derived from an output of the filter.

In one embodiment, the filter may process pixels belonging to one or more regions (comprised in at least part of the semantic information) differently than pixels not belonging to the one or more regions to enhance a user viewing experience, such as an objective visual quality metric (e.g., mean-squared error, MSE) or a subjective visual quality metric (e.g., mean opinion score, MOS).

In one embodiment, the filter may process pixels belonging to detected persons to enhance the accuracy of an action recognition NN that may be applied on the output of the filter or on data derived from the output of the filter.

In one embodiment, the filter may process pixels of the input frame that are associated to one or more regions (for example, semantic segmentation masks or bounding boxes, representing the semantic information) to enhance the accuracy of a NN applied on the output of the filter, where this NN, for example, may be used as part of an autonomous driving system.

In one embodiment, the filter may enhance pixels in the input frame that are associated to detected objects (e.g., pixels in correspondence of bounding boxes) more than the rest of the pixels. In one example, a first and a second multiplier are predetermined or are determined based on the input image and/or the semantic info, where the first multiplier has a higher value than the second multiplier; the first multiplier is used to multiply an internal signal of the postfilter or an output of the postfilter, which is associated to the pixels contained in the bounding boxes; the second multiplier is used to multiply an internal signal of the postfilter or an output of the postfilter, which is associated to the rest of the pixels.

In one embodiment, the filter may process (for example, blur or flatten) pixels of the input frame that are not associated to detected objects (e.g., pixel values are set to a single number or to a number from a limited range) to reduce false positives in the results of one or more task neural networks applied on an output of the filter or on data derived from an output of the filter, such as an object detection NN.

In one embodiment, the filter may distort or modify pixels of the input frame that are associated to one or more regions (such as semantic segmentation masks or detected objects within bounding boxes) such that certain information that is present in the picture that is input to the filter cannot be exploited or analyzed or inferred by the task of interest. In one example, detected faces and plate numbers may be anonymized for privacy preservation purposes.

In one embodiment, the input frame may be processed by a first initial set of neural network layers and the input semantic information may be processed by a second initial set of neural network layers. The output of the first and second initial sets of neural network layers may be combined, for example by concatenation or summation, and the result of the combination may be input to a third set of NN layers. The output of the third set of NN layers may represent the output of the postfilter.

In one embodiment, the semantic information may be used to determine an input to the filter.

In an embodiment, the semantic information may be used to determine an output of a filtering process based at least on the output of the filter.

In one embodiment, one or more regions comprised in the semantic information may be used for determining respective one or more subsets of pixels comprised in the set of pixels of the original input picture, where the one or more subsets of pixels correspond spatially to the one or more regions, and providing the one or more subsets of pixels as input to the filter.

In one embodiment, one or more regions comprised in the semantic information may be used for determining a subset of pixels comprised in the set of pixels of the original input picture, where the subset of pixels comprises pixels that correspond spatially to the one or more regions and may have a rectangular shape, and providing the set of pixels as input to the filter.

In one embodiment, one or more regions comprised in the semantic information may be used for determining which part of the picture to be filtered (e.g., a decoded picture) is to be replaced with one or more outputs of the filter. For example, when the filter filters one subset of pixels of the picture, where the subset of pixels corresponds spatially to one region, the filter outputs a filtered version of that subset of pixels. The information about the region is used to replace the pixels corresponding to the region in the picture with the filtered region.

In one embodiment, after the filtering, a post-processing operation may be applied to an output of the filter or to data derived to an output of the filter. For example, blurring of the edges of a filtered subset of pixels may be performed. The post-processing operation may be performed based on one or more parameters, where the one or more parameters may be predefined, or may be signaled from an encoder to a decoder or receiver.

The semantic information may be determined at encoder side or at decoder side or may be provided externally.

In an embodiment, when the semantic information is determined at encoder side, the semantic information may be signaled to the decoder side as metadata, for example within an SEI message.

In an embodiment, the annotated regions SEI message, as defined in the VSEI standard, may be used to carry the semantic information from the encoder to the decoder.

In an embodiment, an SEI message, such as an NNPFA SEI message, activating a particular post-filter may be used to carry the semantic information for filtering the pictures for which the post-filter is activated by the SEI message.

In an embodiment, an SEI message, such as an NNPFA SEI message or a regional neural-network post-filter activation SEI message, activating a particular post-filter may be used to carry regions of interest for filtering the pictures for which the post-filter is activated by the SEI message. In one example, the following syntax may be used:

| | Descriptor |
|---|---|
| nn_post_filter_activation( payloadSize ) { | |
|    nnpfa_target_id | ue(v) |
|    nnpfa_cancel_flag | u(1) |
|    if( !nnpfa_cancel_flag ) { | |
|      nnpfa_persistence_flag | u(1) |
|      if( more_data_in_payload( ) ) { | |
|        nnpfa_region_flag | u(1) |
|        if( nnpfa_region_flag ) | |
|          nnpfa_regions( ) | |
|      } | |
|    } | |
|    for( i = 0; more_data_in_payload( ); i++ ) | |
|      nnpfa_extension_bit[ i ] | u(1) |
| } | |

Where:

more_data_in_payload( ) is a syntax function that returns TRUE when the SEI message includes more data after the current position in the bitstream and FALSE when the SEI message does not include more data after the current position in the bitstream;

nnpfa_region_flag equal to 1 indicates that the NNPFA SEI message includes regions to be provided as input to the NNPF;

nnpf_regions( ) is a syntax structure defining the regions, for example, indicative of the number of regions, and for each region the top-left corner, the width, and the height;

nnpfa_extension_bit [i] is reserved for future use.

Another way to specify the syntax function more_data_in_payload( ) is as follows: when byte_aligned( ) is equal to TRUE and the current position in the sei_payload( ) syntax structure, such as the nn_post_filter_activation(payloadSize) syntax structure, is 8*payloadSize bits from the beginning of the sei_payload( ) syntax structure, the return value of more_data_in_payload( ) is equal to FALSE. Otherwise, the return value of more_data_in_payload( ) is equal to TRUE. The syntax function byte_aligned( ) may be specified as follows: when the current position in the bitstream is on a byte boundary, e.g., the next bit in the bitstream is the first bit in a byte, the return value of byte_aligned( ) is equal to TRUE. Otherwise, the return value of byte_aligned( ) is equal to FALSE.

In one embodiment, the encoder may indicate the type of post-processing to be performed based on the indicated metadata. For example, the encoder may indicate that frame rate upsampling is to be applied based on the indicated metadata.

In an embodiment, the NNPFC SEI message is amended to comprise an auxiliary input for the semantic information. For example, nnpfc_auxiliary_inp_idc equal to a pre-defined value, such as 2, may indicate pre-defined semantic information according to any other embodiment. In another example, a certain bit position of nnpfc_auxiliary_inp_idc, when equal to 1, may indicate pre-defined semantic information according to any other embodiment. For example, bit position 2 of nnpfc_auxiliary_inp_idc may be used, in which case (nnpfc_auxiliary_inp_idc & 2) equal to 2 (where & is a bit-wise AND operation as specified in ANSI-C) may indicate pre-defined semantic information according to any other embodiment.

In an embodiment, an encoder indicates that a post-processing filter is to perform one or more certain operations to the pixels or regions related to the semantic information. For example, the encoder may indicate that the post-filter is to perform edge enhancement and/or contrast enhancement to regions associated with certain object classes such as human and vehicle, or regions with saliency or importance score higher than an indicated threshold value. In another example, the encoder may indicate that the post-filter is to increase brightness of regions associated with certain object classes when the brightness of the decoded picture is lower than an indicated threshold value.

In an embodiment, an encoder indicates one or more regions and respective one or more indications of target operations. The one or more regions and the respective one or more indications of target operations, or data derived therefrom, may be input to the filter. The filter may use the one or more regions and the respective one or more indications of target operations, or data derived therefrom, for applying the indicated target operations to the respective regions.

In an embodiment, an encoder indicates that a post-processing filter indicated to be performed with the semantic information does not modify the characteristics related to the semantic information. For example, when object bounding boxes are used as semantic information given as input to the post-filter, the encoder may indicate that the post-filter does not introduce affine transformations such as scaling (magnifying objects), or changing the relative position of objects.

In an embodiment, an encoder indicates that a frame rate upsampling post-processing filter indicated to be performed with the semantic information does not modify the characteristics related to the semantic information in the frames generated by the post-processing filter, when compared to the respective original frames that were not encoded. For example, when object bounding boxes are used as semantic information given as input to the frame rate upsampling post-filter, the encoder may indicate that the post-filter does not introduce substantial affine transformations such as scaling (magnifying objects), or changing the relative position of objects substantially within the frames generated by the post-filter, when compared to the respective original frames that were not encoded. This indication may be further characterized by further characterization, such as the maximum scaling difference and/or the maximum position difference that may be present in the generated frames.

In order to obtain the semantic information, the encoder may run one or more machine analysis tasks on an uncompressed frame, which may be associated to the frame input to the postfilter (e.g., same picture order count) or a different frame. For example, the encoder runs an object detection neural network on an uncompressed frame, obtaining one or more bounding boxes representing the semantic information.

Figures 4, 5:
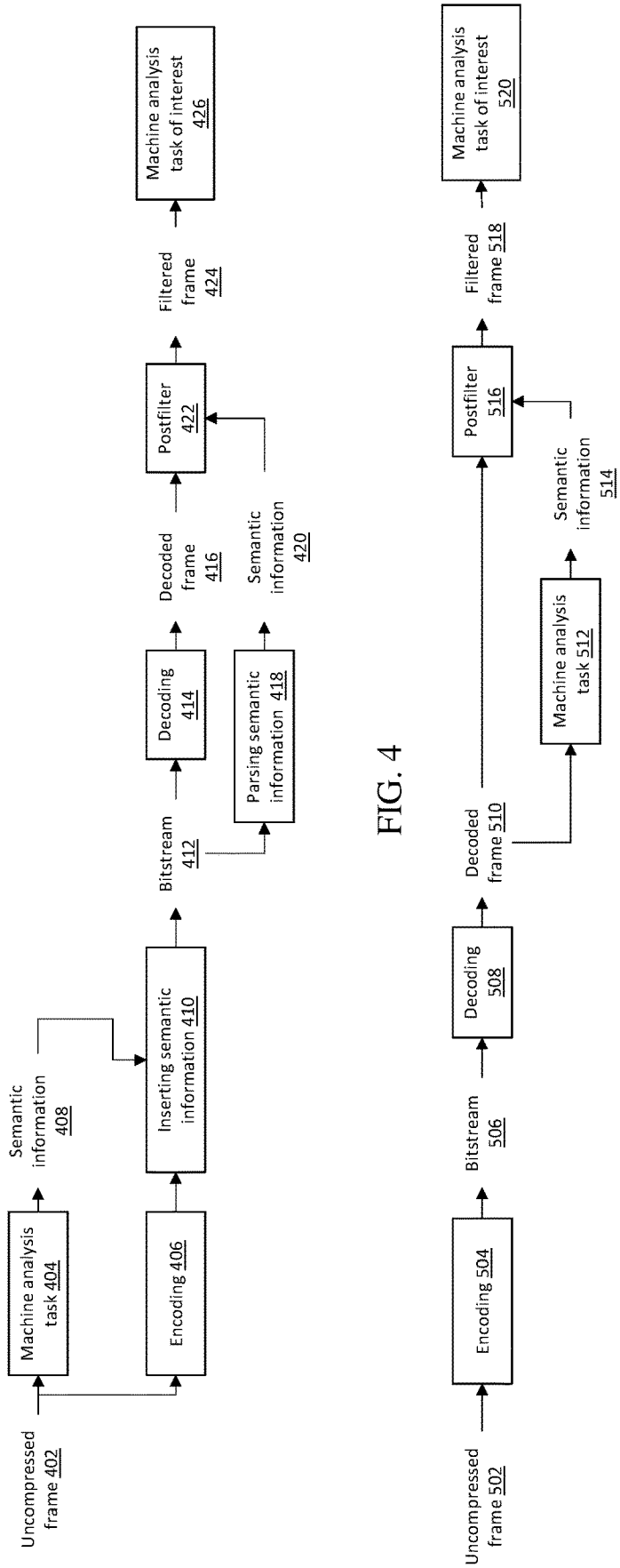
FIG. 4 illustrates an example where the semantic information is determined at encoder side and signaled to the decoder side, in accordance with an embodiment.
FIG. 5 illustrates an example where the semantic information is determined at decoder side, in accordance with an embodiment.

FIG. 4 illustrates an example where the semantic information is determined at encoder side and signaled to the decoder side, in accordance with an embodiment. An uncompressed frame 402 is input to both a machine analysis task 404 (e.g., an object detection NN) and an encoder 406. The machine analysis task 404 outputs semantic information 408. The semantic information 408 and the output the encoder 406 are inserted 410 into a bitstream 412. A first part of the bitstream is decoded 414 by a decoder into a decoded frame 416. A second part of the bitstream is decoded and parsed 418 to obtain a semantic information 420. The decoded frame 416 and the semantic information 420 are provided as input to a postfilter 422 to obtain a filtered frame 424. The filtered frame 424 is input to a machine analysis task of interest 426, such as an object detection neural network.

When the semantic information is determined at decoder side, the decoder device may run one or more machine analysis tasks on the frame that is to be filtered, or on the filtered frame, or on another frame.

FIG. 5 illustrates an example where the semantic information is determined at decoder side, in accordance with an embodiment. In this embodiment, a machine analysis task is run on a decoded frame. An uncompressed frame 502 is input to an encoder 504, such as a video encoder, to obtain a bitstream 506. The bitstream 506 is input to a decoder 508, such as a video decoder, to obtain a decoded frame 510. The decoded frame 510 is input to a machine analysis task 512, such as an object detection NN, to obtain semantic information 514. The decoded frame 510 and the semantic information 514 are input to a postfilter 516, to obtain a filtered frame 518. The filtered frame 518 is input to a machine analysis task of interest 520, such as a NN that analyses objects.

Figures 6, 7:
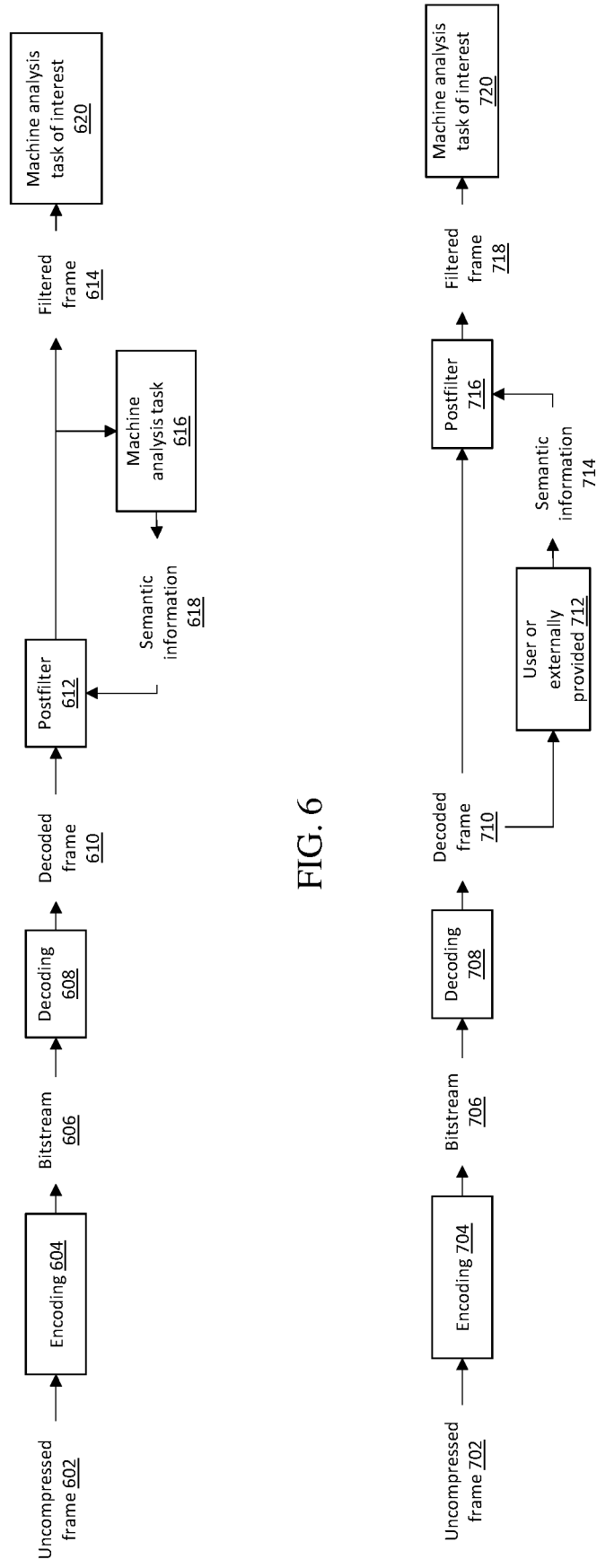
FIG. 6 illustrates an example where the semantic information is determined at decoder side, in accordance with an embodiment.
FIG. 7 illustrates an example where the semantic information is provided externally by a user based on a decoded frame, in accordance with an embodiment.

FIG. 6 illustrates an example where the semantic information is determined at decoder side, in accordance with an embodiment. An uncompressed frame 602 is input to an encoder 604, such as a video encoder, to obtain a bitstream 606. The bitstream 606 is input to a decoder 608, such as a video decoder, to obtain a decoded frame 610. The decoded frame 610 is input to a postfilter 612, to obtain a filtered frame 614. In this embodiment, a machine analysis task 616 is run on a filtered frame 614 and the semantic information 618 is fed back to the postfilter 612 for filtering either the same frame (e.g., frame with same picture order count) that was analyzed by the machine analysis task 616 or for filtering another frame such as a subsequent frame in display order. The filtered frame 614 is input to a machine analysis task of interest 620, such as a NN that analyses objects.

The one or more machine analysis tasks run by the encoder or by the decoder device may not need to be the same machine analysis tasks of interest that are run on the output of the postfilter, or on data derived from the output of the postfilter. They may differ in one or more aspects, including, but not limited to, the following:

The type of task (e.g., object detection, instance segmentation, depth estimation);

The architecture of the neural network performing the task; and/or

The values of one or more parameters comprised in the neural network performing the task.

For example, the one or more machine analysis tasks that is run on the input frame of the postfilter comprises a person detection NN, that provides detected persons; the machine analysis task of interest that is run on the output of the postfilter may be an action recognition NN that analyzes the image data contained in the bounding boxes around the detected persons. In this example, the postfilter may enhance the image data contained in the bounding boxes, so that machine analysis tasks of interest such as action recognition could perform with higher accuracy.

In an embodiment, an encoder indicates, in or along a bitstream, the machine analysis task (e.g., 512 or 616) suggested to be performed by a decoder. In an embodiment, the encoder indicates the machine analysis task suggested to be performed by a decoder with one or more NNPFC SEI messages or alike, and activates the machine analysis tasks for specific frames with one or more NNPFA SEI messages or alike.

In an embodiment, a decoder decodes, from or along a bitstream, the machine analysis task (e.g., 512 or 616) that is suggested to be performed, and performs the machine analysis task accordingly. In an embodiment, the decoder decodes the machine analysis task that is suggested to be performed from one or more NNPFC SEI messages or alike, and activates the machine analysis tasks for specific frames as decoded from one or more NNPFA SEI messages or alike.

In an embodiment, the syntax of an NNPFC SEI message or alike is amended with information indicative of the types of the semantic information that are output by the machine analysis task defined by the NNPFC SEI message or alike. The semantic information may comprise data describing one or more semantic features of the frame(s) provided as input to the machine analysis task. Examples of the semantic information have been described above. The machine analysis task may output the semantic information as part(s) of the output tensor resulting from the inference of the neural network that performs the machine analysis task.

In an embodiment, the syntax of an NNPFC SEI message or alike is amended with information indicative of one or more features that may be specific to the indicated type of semantic information that is output by the machine analysis task defined by the NNPFC SEI message or alike. In one example, when the indicated type of semantic information that is output by the machine analysis task defined by the NNPFC SEI message or alike is classification, the NNPFC SEI message comprises information indicative of the number of classes that are considered or output by the machine analysis task.

In an embodiment, the syntax of an NNPFC SEI message or alike is amended with a syntax element, for example, called nnpfc_auxiliary_out_idc, indicating the type(s) of auxiliary output present in the output tensor of the NNPF. The type(s) of auxiliary output may comprise or be indicative of the types of the semantic information that are output by the machine analysis task defined by the NNPFC SEI message or alike.

In the syntax of an NNPFC SEI message, nnpfc_output_order_idc indicates the output order of samples resulting from the NNPF. In an embodiment, new values of nnpfc_output_order_idc indicate the type(s) of auxiliary output present in the output tensor of the NNPF. The type(s) of auxiliary output may comprise or be indicative of the types of the semantic information that are output by the machine analysis task defined by the NNPFC SEI message or alike.

When the semantic information is provided externally, it may be provided directly to the postfilter or it may be provided to an interface that converts an input signal into the format of semantic information that is accepted by the postfilter. In one example, the externally-provided semantic information may be provided by a user, who may indicate a point on the image which is to be filtered or processed. The point may be converted to a region or to a bounding box, for example by running a segmentation NN or a detection NN, and information about the region or bounding box may be then input to the postfilter as the semantic information. The user may additionally provide information about the type of processing or filtering that the postfilter needs to perform; such information may be input directly to the postfilter, or may be converted to suitable parameters that control the postfilter, or may be used to select a suitable postfilter out of several available postfilters.

FIG. 7 illustrates an example where the semantic information is provided externally by a user based on a decoded frame, in accordance with an embodiment. An uncompressed frame 702 is input to an encoder 704, such as a video encoder, to obtain a bitstream 706. The bitstream 706 is input to a decoder 708, such as a video decoder. The decoder 708 decodes the bitstream 706 into a decoded frame 710. The decoded frame 710 is provided to a user or to an external entity or device 712, to obtain semantic information 714. The decoded frame 710 and the semantic information 714 are input to a postfilter 716, to obtain a filtered frame 718. The filtered frame 718 is input to a machine analysis task of interest 720.

In one embodiment, the semantic information is generated at encoder side or at decoder side for a first subset of frames, and used as an input to the postfilter when filtering a second subset of frames.

In one example, a first frame is encoded at a high quality and subsequent frames are encoded at a low quality, obtaining a first encoded frame and subsequent encoded frames, respectively; at decoder side, the first encoded frame and the subsequent encoded frames are decoded, obtaining a first decoded frame and subsequent decoded frames, respectively; a first machine analysis task is run on the first decoded frame, or on data derived from the first decoded frame such as a filtered first decoded frame; the obtained semantic information is input to the postfilter when filtering the subsequent frames; the semantic information is used by the postfilter as a mask, in order to filter only image data within the bounding boxes (or slightly extended bounding boxes), or to filter with higher strength the image data within the (extended) bounding boxes and with less strength the image data outside of the (extended) bounding boxes.

In various embodiments, the terms 'machine vision', 'machine vision task', 'machine task', 'machine analysis', 'machine analysis task', 'computer vision', 'computer vision task', and 'task' may be used interchangeably.

In various embodiments, the terms 'machine consumption' and 'machine analysis' may be used interchangeably.

In various embodiments, the terms 'machine-consumable' and 'machine-targeted' may be used interchangeably.

In various embodiments, the terms 'human observation', 'human perception', 'displaying', 'displaying to human beings', 'watching', and 'watching by human beings' may be used interchangeably.

In various embodiments, the terms 'post-filter', 'post-processing filter' and 'postprocessing filter' may be used interchangeably.

Figure 8:
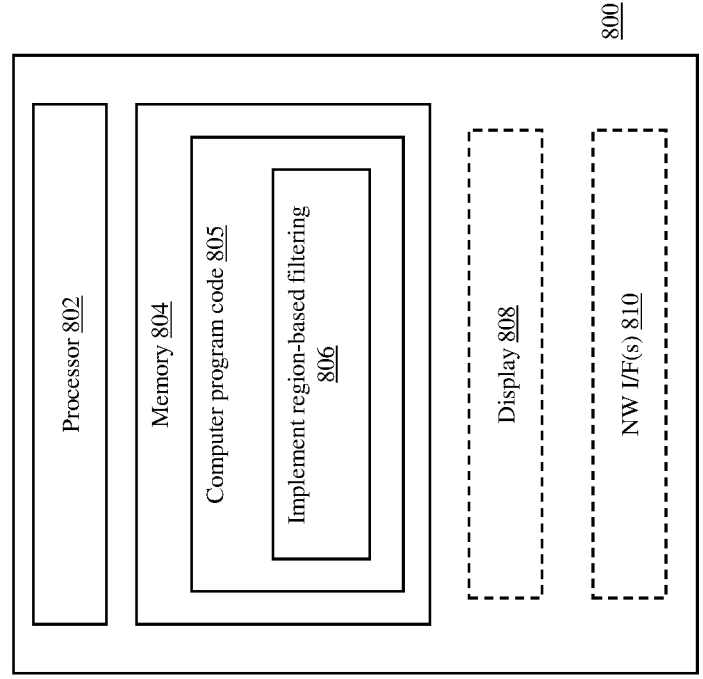
FIG. 8 is an example apparatus, which may be implemented in hardware, and is caused to, implement region-based filtering based on the examples described herein.

FIG. 8 is an example apparatus 800, which may be implemented in hardware, caused to implement region-based filtering coding, based on the examples described herein. The apparatus 800 comprises at least one processor 802, at least one non-transitory memory 804 including computer program code 805, wherein the at least one memory 804 and the computer program code 805 are configured to, with the at least one processor 802, cause the apparatus 800 to implement region-based filtering coding 806, based on the examples described herein.

The apparatus 800 optionally includes a display 808 that may be used to display content during rendering. The apparatus 800 optionally includes one or more network (NW) interfaces (I/F(s)) 810. The NW I/F(s) 810 may be wired and/or wireless and communicate over the Internet/other network(s) via any communication technique. The NW I/F(s) 810 may comprise one or more transmitters and one or more receivers. The N/W I/F(s) 810 may comprise standard well-known components such as an amplifier, filter, frequency-converter, (de) modulator, and encoder/decoder circuitry(ies) and one or more antennas.

The apparatus 800 may be a remote, virtual or cloud apparatus. The apparatus 800 may be either a coder or a decoder, or both a coder and a decoder. The at least one memory 804 may be implemented using any suitable data storage technology, such as semiconductor based memory devices, flash memory, magnetic memory devices and systems, optical memory devices and systems, fixed memory and removable memory. The at least one memory 804 may comprise a database for storing data. The apparatus 800 need not comprise each of the features mentioned, or may comprise other features as well. The apparatus 800 may correspond to or be another embodiment of the apparatus 50 shown in FIG. 1 and FIG. 2, any of the apparatuses shown in FIG. 3, or apparatus 700 of FIG. 7. The apparatus 800 may correspond to or be another embodiment of the apparatuses shown in FIG. 13, including UE 110, RAN node 170, or network element(s) 190.

Figure 9:
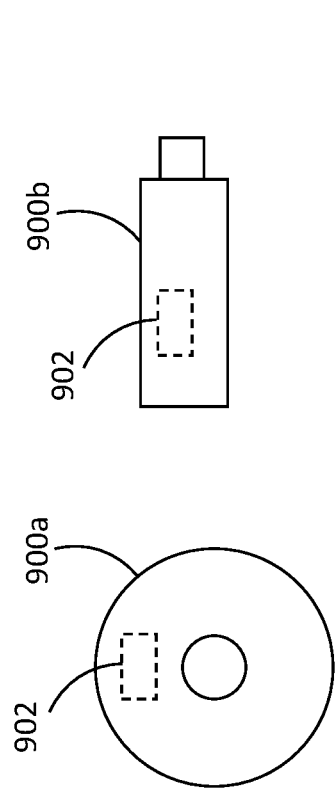
FIG. 9 shows a schematic representation of non-volatile memory media.

FIG. 9 shows a schematic representation of non-volatile memory media 900a (e.g., computer/compact disc (CD) or digital versatile disc (DVD)) and 900b (e.g., universal serial bus (USB) memory stick) storing instructions and/or parameters 902 which when executed by a processor allows the processor to perform one or more of the steps of the methods described herein.

Figure 10:
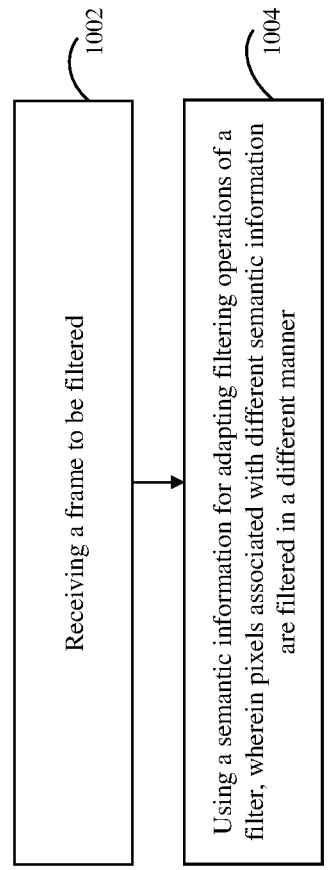
FIG. 10 is an example method to implement the embodiments described herein, in accordance with an embodiment.

FIG. 10 is an example method 1000 to implement the examples described herein, in accordance with an embodiment. At 1002, the method 1000 includes receiving a frame to be filtered. At 1004, the method 1000 includes using a semantic information for adapting filtering operations of a filter, wherein pixels associated with different semantic information are filtered in a different manner.

In an embodiment, the semantic information comprises: data describing one or more semantic features of the frame; or a mask. In an embodiment, the one or more semantic features comprises one or more of the following: position and size information of one or more regions present in the input image that are to be treated specifically by the post-filter; position and size information of one or more objects comprised in the frame; contour, silhouette, or shape of the one or more objects comprised in the frame; information about a class or category to which an object belongs; textual object label; a language of the object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The method 1000 may be performed with an apparatus described herein, for example, the apparatus 50, 800, and the like.

Figure 11:
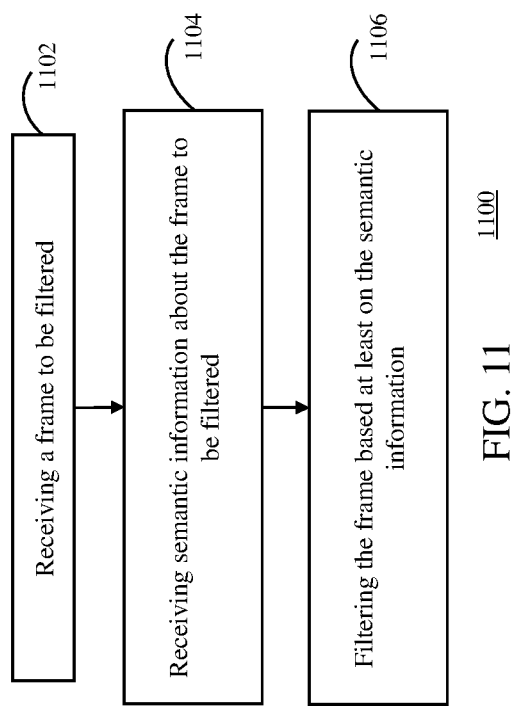
FIG. 11 is an example method to implement the embodiments described herein, in accordance with another embodiment.

FIG. 11 is an example method 1100 to implement the embodiments described herein, in accordance with another embodiment. At 1102, the method 1100 includes receiving a frame to be filtered. At 1104, the method 1100 includes receiving semantic information about the frame to be filtered. At 1106, the method 1100 includes filtering the frame based at least on the semantic information.

In an embodiment, one or more first pixels in the frame are filtered differently from one or more second pixels in the frame, wherein indication of at least one of the one or more first pixels and the one or more second pixels is comprised in the semantic information.

Some examples of the semantic information include, but are not limited to, one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The method 1100 may be performed with an apparatus described herein, for example, the apparatus 50, 800, and the like.

Figure 12:
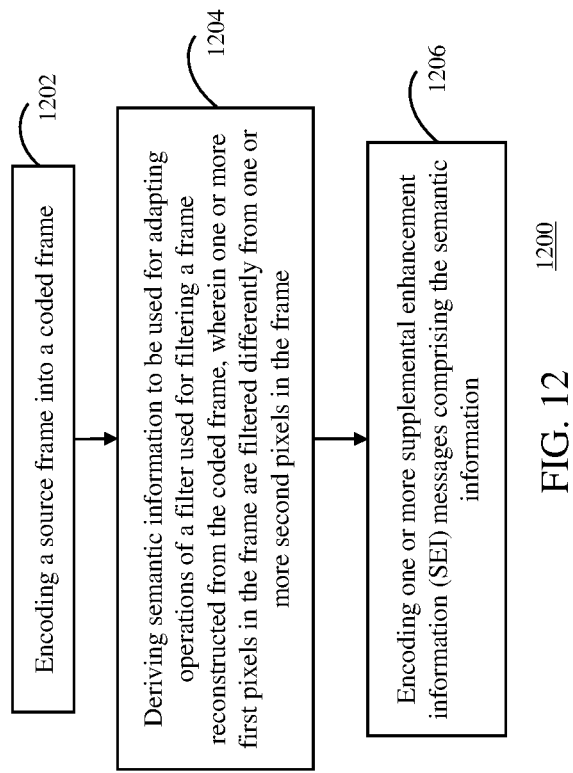
FIG. 12 is an example method to implement the embodiments described herein, in accordance with yet another embodiment.

FIG. 12 is an example method 1200 to implement the embodiments described herein, in accordance with yet another embodiment. At 1202, the method 1200 includes encoding a source frame into a coded frame. At 1204, the method 1200 includes deriving semantic information to be used for adapting operations of a filter used for filtering a frame reconstructed from the coded frame, wherein one or more first pixels in the frame are filtered differently from one or more second pixels in the frame. At 1206, the method 1200 includes and encoding one or more supplemental enhancement information (SEI) messages comprising the semantic information.

Some examples of the semantic information include, but are not limited to, one or more of the following: a mask; position and size information of one or more regions present in the frame to be filtered; position and size information of one or more objects comprised in the frame; contour, silhouette, or shape of the one or more objects comprised in the frame; information about a class or category to which an object belongs; textual object label; a language of an object label; instance identity to identify a specific object; confidence associated with the semantic information in general and/or an individual semantic information, wherein the confidence comprises a certain range between a lowest confidence value and a highest confidence value indicating how confident or reliable associated semantic information is; or saliency or importance associated with the semantic information in general and/or the individual semantic information.

The method 1200 may be performed with an apparatus described herein, for example, the apparatus 50, 800, and the like.

Figure 13:
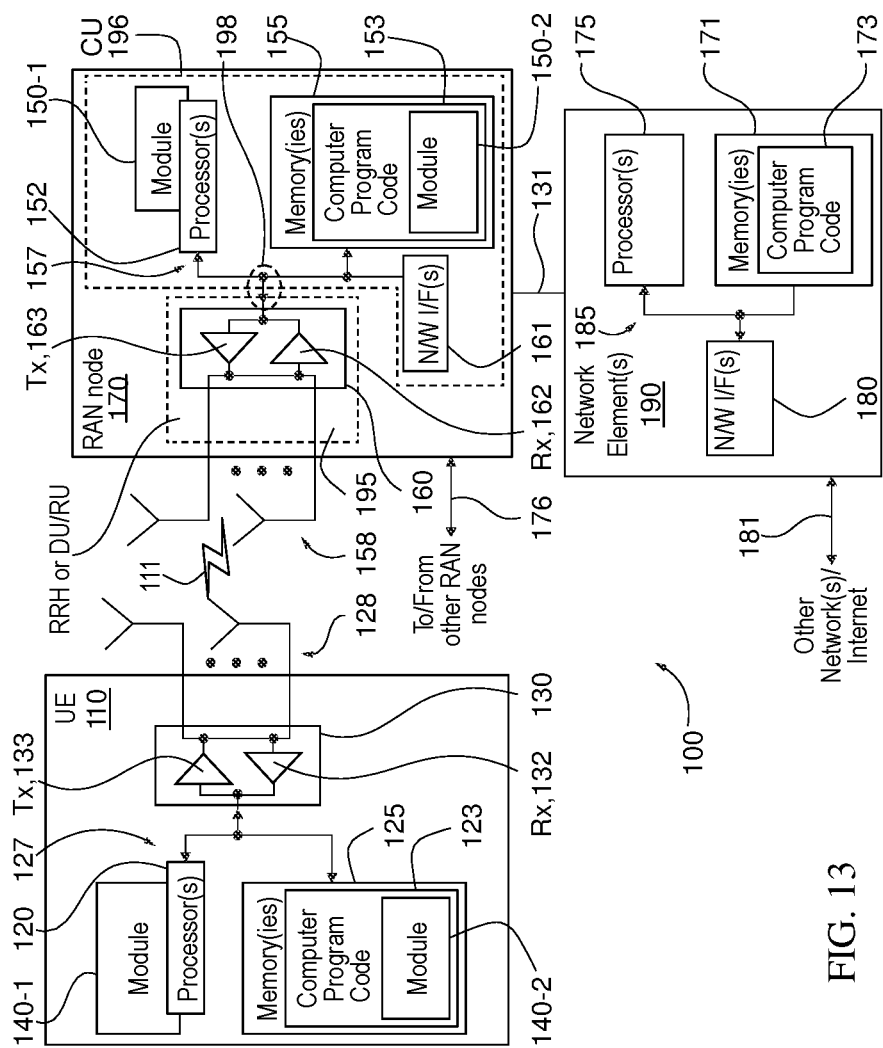
FIG. 13 is a block diagram of one possible and non-limiting system in which the example embodiments may be practiced.

Referring to FIG. 13, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that 'cells' perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement region-based filtering video coding. Computer program code 173 may also be configured to implement region-based filtering.

As described above, FIGS. 10, 11, and 12 include flowcharts of an apparatus (e.g. 50 or 800), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, or 804) of an apparatus employing an embodiment of the present invention and executed by processing circuitry (e.g. 56, 120, or 802) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 10, 11, and 12. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

In the above, some example embodiments have been described with the help of syntax of the bitstream. It needs to be understood, however, that the corresponding structure and/or computer program may reside at the encoder for generating the bitstream and/or at the decoder for decoding the bitstream.

In the above, where example embodiments have been described with reference to an encoder, it needs to be understood that the resulting bitstream and the decoder have corresponding elements in them. Likewise, where example embodiments have been described with reference to a decoder, it needs to be understood that the encoder has structure and/or computer program for generating the bitstream to be decoded by the decoder.

In the above, some embodiments have been described with reference to specific SEI messages, such as NNPFC SEI message(s) and/or NNPFA SEI message(s). It needs to be understood that embodiments may similarly be realized with any SEI messages of similar nature. For example, some embodiments may be realized with post-filter characteristics and/or activation SEI message(s) where post-filters are not based on neural networks.

In the above, some example embodiments have been described with reference to an SEI message or an SEI NAL unit. It needs to be understood, however, that embodiments may similarly be realized with any similar structures or data units, such as metadata OBUs. Where example embodiments have been described with SEI messages included in a structure, any independently parsable structures could likewise be used in embodiments. Specific SEI NAL unit and SEI message syntax structures have been presented in example embodiments, but it needs to be understood that embodiments generally apply to any syntax structures with a similar intent as SEI NAL units and/or SEI messages.

In the above, some embodiments have been described with reference to a post-filter or a post-processing filter. It is to be understood that embodiments may similarly be realized with reference to a loop filter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, and the like.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Circuitry or Circuit: As used in this application, the term "circuitry" or "circuit" may refer to one or more or all of the following:
(a) hardware-only circuit implementations (such as implementations in only analog and/or digital circuitry); and
(b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus comprising at least one processor; and at least one non-transitory memory storing instructions that, when executed by the at least one processor, cause the apparatus at least to perform:
   receiving a frame to be filtered;
   receiving semantic information about the frame to be filtered; and
   filtering the frame based at least on the semantic information;
   wherein the semantic information comprises one or more of the following:
   a mask;
   position and size information of one or more regions present in the frame to be filtered;
   position and size information of one or more objects comprised in the frame;
   contour, silhouette, or shape of the one or more objects comprised in the frame;
   information about a class or category to which an object belongs;
   textual object label;
   a language of an object label;
   instance identity to identify a specific object;
   confidence associated with the semantic information in general and/or an individual semantic information, wherein the confidence comprises a certain range between a lowest confidence value and a highest confidence value indicating how confident or reliable associated semantic information is; or
   saliency or importance associated with the semantic information in general and/or the individual semantic information.

2. The apparatus of claim 1, wherein one or more first pixels in the frame are filtered differently from one or more second pixels in the frame, wherein indication of at least one of the one or more first pixels and the one or more second pixels is comprised in the semantic information.

3. The apparatus of claim 1, wherein the apparatus is further caused to receive the semantic information from an external source, and wherein when the semantic information is received from the external source, the semantic information is provided directly to a filter or provided to an interface that converts an input signal into a format of semantic information that is accepted by the filter.

4. The apparatus of claim 1, wherein the frame comprises a first subset of frames and a second subset of frames, and wherein the apparatus is further caused to perform:
   using the semantic information as an input to a filter when filtering the second subset of frames, where the semantic information was determined based on the first subset of frames.

5. The apparatus of claim 1, wherein:
   a filter processes one or more pixels belonging to one or more regions comprised or indicated in at least part of the semantic information differently as compared to pixels not belonging to the one or more regions to enhance the accuracy of one or more task neural networks applied to an output of a filter or to data derived from the output of the filter; or
   the filter processes one or more pixels belonging to the one or more regions comprised or indicated in at least part of the semantic information differently from the pixels not belonging to the one or more regions to enhance a user viewing experience.

6. The apparatus of claim 5, wherein the apparatus is further caused to perform:
   using the one or more regions comprised or indicated in the semantic information to determine respective one or more subsets of pixels comprised in a set of pixels of the frame, wherein the one or more subsets of pixels correspond spatially to the one or more regions;
   providing the one or more subsets of pixels as input to the filter; and
   using the one or more regions comprised or indicated in the semantic information to determine which part of the frame to be filtered is to be replaced with one or more outputs of the filter.

7. The apparatus of claim 6, wherein the apparatus is further caused to perform: applying a post-processing operation to the output of the filter or to data derived from the output of the filter, wherein the post-processing operation is performed based on one or more parameters, and wherein the one or more parameters are predefined, or are signaled from an encoder to a decoder or a receiver.

8. The apparatus of claim 1, wherein the apparatus is further caused to perform:
receiving one or more supplemental enhancement information (SEI) messages comprising the semantic information; and
obtaining the semantic information from the one or more SEI messages.

9. A method comprising:
receiving a frame to be filtered;
receiving semantic information about the frame to be filtered; and
filtering the frame based at least on the semantic information;
wherein the semantic information comprises one or more of the following:
a mask;
position and size information of one or more regions present in the frame to be filtered;
position and size information of one or more objects comprised in the frame;
contour, silhouette, or shape of the one or more objects comprised in the frame;
information about a class or category to which an object belongs;
textual object label;
a language of an object label;
instance identity to identify a specific object;
confidence associated with the semantic information in general and/or an individual semantic information, wherein the confidence comprises a certain range between a lowest confidence value and a highest confidence value indicating how confident or reliable associated semantic information is; or
saliency or importance associated with the semantic information in general and/or the individual semantic information.

10. The method of claim 9, wherein one or more first pixels in the frame are filtered differently from one or more second pixels in the frame, wherein indication of at least one of the one or more first pixels and the one or more second pixels is comprised in the semantic information.

11. The method of claim 9 further comprising receiving the semantic information from an external source, and wherein when the semantic information is received from the external source, the semantic information is provided directly to a filter or provided to an interface that converts an input signal into a format of semantic information that is accepted by the filter.

12. The method of claim 9, wherein the frame comprises a first subset of frames and a second subset of frames, and wherein the method further comprises:
using the semantic information as an input to a filter when filtering the second subset of frames, where the semantic information was determined based on the first subset of frames.

13. The method of claim 9, wherein:
a filter processes one or more pixels belonging to one or more regions comprised or indicated in at least part of the semantic information differently as compared to pixels not belonging to the one or more regions to enhance the accuracy of one or more task neural networks applied to an output of a filter or to data derived from the output of the filter; or
the filter processes one or more pixels belonging to the one or more regions comprised or indicated in at least part of the semantic information differently from the pixels not belonging to the one or more regions to enhance a user viewing experience.

14. The method of claim 13 further comprising:
using the one or more regions comprised or indicated in the semantic information to determine respective one or more subsets of pixels comprised in a set of pixels of the frame, wherein the one or more subsets of pixels correspond spatially to the one or more regions;
providing the one or more subsets of pixels as input to the filter; and
using the one or more regions comprised or indicated in the semantic information to determine which part of the frame to be filtered is to be replaced with one or more outputs of the filter.

15. The method of claim 14 further comprising applying a post-processing operation to the output of the filter or to data derived from the output of the filter, wherein the post-processing operation is performed based on one or more parameters, and wherein the one or more parameters are predefined, or are signaled from an encoder to a decoder or a receiver.

16. The method of claim 9 further comprising:
receiving one or more supplemental enhancement information (SEI) messages comprising the semantic information; and
obtaining the semantic information from the one or more SEI messages.

17. An apparatus comprising at least one processor; and at least one non-transitory memory storing instructions that, when executed by the at least one processor, cause the apparatus at least to perform:
encoding a source frame into a coded frame;
deriving semantic information to be used for adapting operations of a filter used for filtering a frame reconstructed from the coded frame, wherein one or more first pixels in the frame are filtered differently from one or more second pixels in the frame; and
encoding one or more supplemental enhancement information (SEI) messages comprising the semantic information;
wherein the semantic information comprises one or more of the following:
a mask;
position and size information of one or more regions present in the frame to be filtered;
position and size information of one or more objects comprised in the frame;
contour, silhouette, or shape of the one or more objects comprised in the frame;
information about a class or category to which an object belongs;
textual object label;
a language of an object label;
instance identity to identify a specific object;
confidence associated with the semantic information in general and/or an individual semantic information, wherein the confidence comprises a certain range between a lowest confidence value and a highest confidence value indicating how confident or reliable associated semantic information is; or
saliency or importance associated with the semantic information in general and/or the individual semantic information.

18. A method comprising:
encoding a source frame into a coded frame;
deriving semantic information to be used for adapting operations of a filter used for filtering a frame reconstructed from the coded frame, wherein one or more first pixels in the frame are filtered differently from one or more second pixels in the frame; and
encoding one or more supplemental enhancement information (SEI) messages comprising the semantic information;
wherein the semantic information comprises one or more of the following:
a mask;
position and size information of one or more regions present in the frame to be filtered;
position and size information of one or more objects comprised in the frame;
contour, silhouette, or shape of the one or more objects comprised in the frame;
information about a class or category to which an object belongs;
textual object label;
a language of an object label;
instance identity to identify a specific object;
confidence associated with the semantic information in general and/or an individual semantic information, wherein the confidence comprises a certain range between a lowest confidence value and a highest confidence value indicating how confident or reliable associated semantic information is; or
saliency or importance associated with the semantic information in general and/or the individual semantic information.

* * * * *